(12) United States Patent
Itou et al.

(10) Patent No.: US 11,386,373 B2
(45) Date of Patent: Jul. 12, 2022

(54) WORK MANAGEMENT DEVICE, WORK MANAGEMENT METHOD, AND PROGRAM STORAGE MEDIUM

(71) Applicant: NEC Corporation, Tokyo (JP)

(72) Inventors: Takehiro Itou, Tokyo (JP); Hisaya Wakayama, Tokyo (JP); Masatsugu Ogawa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 31 days.

(21) Appl. No.: 16/492,203

(22) PCT Filed: Mar. 20, 2018

(86) PCT No.: PCT/JP2018/010939
§ 371 (c)(1),
(2) Date: Sep. 9, 2019

(87) PCT Pub. No.: WO2018/180743
PCT Pub. Date: Apr. 10, 2018

(65) Prior Publication Data
US 2020/0042921 A1    Feb. 6, 2020

(30) Foreign Application Priority Data
Mar. 31, 2017   (JP) .............................. JP2017-072059

(51) Int. Cl.
*G06Q 10/06* (2012.01)
*G06Q 10/04* (2012.01)

(52) U.S. Cl.
CPC ... *G06Q 10/06316* (2013.01); *G06Q 10/0633* (2013.01); *G06Q 10/06393* (2013.01); *G06Q 10/06398* (2013.01); *G06Q 10/047* (2013.01)

(58) Field of Classification Search
CPC ......... G06Q 10/06316; G06Q 10/0633; G06Q 10/06393; G06Q 10/06398; G06Q 10/047
(Continued)

(56) References Cited

U.S. PATENT DOCUMENTS 5,293,309 A * 3/1994 Sakai .................. G06Q 10/0875
                                                              705/29
7,487,106 B2 * 2/2009 Levine ................... G06Q 10/06
                                                              705/7.14
(Continued)

FOREIGN PATENT DOCUMENTS

CA    2835720 A1 * 6/2014 ..... G06Q 10/063114
JP    H05-123947 A    5/1993
(Continued)

OTHER PUBLICATIONS

Claudia "Work discipline and corporate training in modernising large companies in Argentina", Dec. 2011, Pluto Journals is collaborating with JSTOR, pp. 130-149 (Year: 2011).*

(Continued)

*Primary Examiner* — Romain Jeanty
(74) *Attorney, Agent, or Firm* — Sughrue Mion, PLLC

(57) ABSTRACT

Provided is a work management device for arranging a worker in consideration of a change of work efficiency. In a work management device 10, an index acquisition unit 11 acquires, for each work section, a work evaluation index calculated based on work history performed by a worker. A duration time acquisition unit 12 acquires a duration time for which a work status of the worker is the work evaluation index. A cost acquisition unit 13 acquires a cost incurred when the worker moves between the work sections. A determination unit 14 acquires an estimated work amount performed by the worker until the duration time is elapsed. The determination unit 14 determines, based on the estimated work amount and cost, arrangement of the workers in the plurality of work sections in such a way as to increase work efficiency in a whole of a work range.

9 Claims, 30 Drawing Sheets

(58) Field of Classification Search
USPC .......................................................... 705/7.39
See application file for complete search history.

(56) References Cited

U.S. PATENT DOCUMENTS

| | | | | |
|---|---|---|---|---|
| 7,835,934 | B2* | 11/2010 | Gundersen | G06Q 10/0639 705/7.15 |
| 8,248,241 | B2* | 8/2012 | Matsumoto | G16H 10/65 340/572.1 |
| 8,290,806 | B2* | 10/2012 | Lee | G06Q 10/0637 705/7.23 |
| 9,317,827 | B2* | 4/2016 | Watanabe | G06Q 10/06315 |
| 9,639,998 | B2* | 5/2017 | Tanabe | G07C 5/008 |
| 9,752,298 | B2* | 9/2017 | Nakamura | E02F 9/2029 |
| 10,410,149 | B2* | 9/2019 | Seki | A01B 79/005 |
| 10,657,477 | B2* | 5/2020 | Kudo | G06Q 10/063114 |
| 2004/0267595 | A1* | 12/2004 | Woodings | G06Q 10/06311 705/7.14 |
| 2006/0267754 | A1* | 11/2006 | Takeda | G05B 23/0264 340/506 |
| 2007/0288306 | A1* | 12/2007 | Ohishi | G06Q 10/06398 700/113 |
| 2012/0136692 | A1* | 5/2012 | Ohishi | G06Q 50/04 705/7.26 |
| 2012/0179511 | A1* | 7/2012 | Lee | G06Q 10/06313 705/7.37 |
| 2014/0350989 | A1* | 11/2014 | Telatar | G06Q 10/1097 705/7.21 |
| 2016/0225106 | A1* | 8/2016 | Shike | G06Q 10/06313 |
| 2019/0072972 | A1* | 3/2019 | Shinkai | E02F 9/2087 |

FOREIGN PATENT DOCUMENTS

| | | |
|---|---|---|
| JP | 2001-092883 A | 4/2001 |
| JP | 2004-280694 A | 10/2004 |
| JP | 2006-209383 A | 8/2006 |
| JP | 2008-004053 A | 1/2008 |
| JP | 2011-118773 A | 6/2011 |
| JP | 5194708 B2 | 5/2013 |

OTHER PUBLICATIONS

International Search Report for PCT Application No. PCT/JP2018/010939, dated Apr. 24, 2018.
English translation of Written opinion for PCT Application No. PCT/JP2018/010939.

* cited by examiner

Fig. 5

| SECTION NAME | SECTION RANGE INFORMATION |
|---|---|
| 5A | FIFTH FLOOR SINGLE ARTICLE FIRST LINE SHELF 1-6 |
| 5B | FIFTH FLOOR SINGLE ARTICLE FIRST LINE SHELF 7-12 |

Fig. 6

| WORKER NAME | COVERAGE SECTION NAME | WORK EVALUATION INDEX |
|---|---|---|
| Worker1 | 5A | 5.0 |
| Worker2 | 5B | 8.0 |

Fig. 7

| SECTION NAME | NUMBER OF WORKERS | REMAINING WORK AMOUNT |
|---|---|---|
| 5A | 1 | 80 |
| 5B | 1 | 50 |

| MOVEMENT SECTION NAME | REQUIRED MOVEMENT TIME |
|---|---|
| 5A ⇒ 5B | 00:05:00 |
| 5B ⇒ 5A | 00:05:00 |

| SECTION NAME | BATCH INPUT INTERVAL (MINUTE) |
|---|---|
| 5A | 10 |
| 5B | 10 |

Fig. 11

| BATCH INPUT TIME | INPUT AMOUNT | |
|---|---|---|
| | WORK SECTION 5A | WORK SECTION 5B |
| 00:10 | 10 | 60 |
| 00:20 | 10 | 60 |

| BATCH INPUT TIME | INPUT AMOUNT | |
|---|---|---|
| | WORK SECTION 5A | WORK SECTION 5B |
| 00:15 | 10 | 60 |
| 00:30 | 10 | 60 |

Fig. 16

| SECTION NAME | NUMBER OF WORKERS | WORK EVALUATION INDEX |
|---|---|---|
| 5A | 15 | 15.0 |
| 5B | 5 | 5.0 |

Fig. 17

| SECTION NAME | REMAINING WORK AMOUNT | NUMBER OF WORKERS | REQUIRED WORK TIME | NUMBER OF WORKERS AFTER CHANGE | ESTIMATED REQUIRED WORK TIME AFTER CHANGE |
|---|---|---|---|---|---|
| 5A | 100 | 15 | 00:06:40 | 9 | 00:11:07 |
| 5B | 100 | 5 | 00:20:00 | 11 | 00:11:48 |

Fig. 18

| WORKER NAME | MOVEMENT INSTRUCTION | | |
|---|---|---|---|
| | COVERAGE SECTION | MOVEMENT DESTINATION SECTION | REQUIRED MOVEMENT TIME |
| WorkerA1 | 5A | 5B | 00:05:00 |
| WorkerA2 | 5A | 5B | 00:05:00 |
| WorkerA3 | 5A | 5B | 00:05:00 |
| WorkerA4 | 5A | 5B | 00:05:00 |
| WorkerA5 | 5A | 5B | 00:05:00 |
| WorkerA6 | 5A | 5B | 00:05:00 |

Fig. 25

| MOVEMENT SECTION NAME | MOVEMENT TIME (MINUTE) |
|---|---|
| 5A⇔5B | 02:00 |
| 5B⇔5C | 02:00 |
| 5A⇔5D | 04:00 |
| 5B⇔5E | 04:00 |
| 5C⇔5F | 04:00 |
| 5D⇔5E | 02:00 |
| 5E⇔5F | 02:00 |
| 5D⇔5G | 04:00 |
| 5E⇔5H | 04:00 |
| 5F⇔5I | 08:00 |
| 5G⇔5H | 02:00 |
| 5H⇔5I | 08:00 |

Fig. 26

| SECTION NAME | WORK ITEM |
| --- | --- |
| 5A | PICKING · INSPECTION |
| 5B | PICKING · INSPECTION |
| 5C | PICKING · INSPECTION |
| 5D | PICKING · INSPECTION |
| 5E | PICKING · INSPECTION |
| 5F | PICKING · INSPECTION |
| 5G | PICKING · INSPECTION |
| 5H | PICKING · INSPECTION |
| 5I | PICKING · INSPECTION |

Fig. 27

| | TIME 16:30 |
|---|---|
| SECTION NAME | NEXT SCHEDULED INPUT TIME |
| 5A | 16:56 |
| 5B | 17:00 |
| 5C | 16:51 |
| 5D | 16:54 |
| 5E | 17:01 |
| 5F | 16:55 |
| 5G | 16:50 |
| 5H | 17:00 |
| 5I | 16:50 |

Fig. 28

| SECTION NAME | REMAINING WORK AMOUNT | NUMBER OF WORKERS | REQUIRED WORK TIME | NUMBER OF WORKERS AFTER CHANGE | MOVEMENT DESTINATION, NUMBER OF WORKERS TO BE MOVED | ESTIMATED REQUIRED WORK TIME AFTER CHANGE |
|---|---|---|---|---|---|---|
| 5A | 100 | 15 | 00:06:40 | 9 | 5B:2, 5D:4 | 00:11:07 |
| 5B | 100 | 10 | 00:10:00 | 9 | 5C:2, 5E:1 | 00:11:33 |
| 5C | 100 | 10 | 00:10:00 | 9 | 5F:3 | 00:11:33 |
| 5D | 100 | 10 | 00:10:00 | 10 | 5E:3, 5G:2 | 00:11:36 |
| 5E | 100 | 10 | 00:10:00 | 9 | 5F:2, 5H:2 | 00:12:00 |
| 5F | 100 | 10 | 00:10:00 | 10 | 5I:5 | 00:11:36 |
| 5G | 100 | 10 | 00:10:00 | 9 | 5H:3 | 00:12:00 |
| 5H | 100 | 10 | 00:10:00 | 10 | 5I:5 | 00:11:24 |
| 5I | 100 | 10 | 00:20:00 | 15 | | 00:12:00 |

Fig. 29

| WORKER NAME | MOVEMENT INSTRUCTION | | |
|---|---|---|---|
| | COVERAGE SECTION | MOVEMENT DESTINATION SECTION | REQUIRED MOVEMENT TIME |
| WorkerA1 | 5A | 5B | 00:02:00 |
| WorkerA2 | 5A | 5B | 00:02:00 |
| WorkerA3 | 5A | 5D | 00:04:00 |
| WorkerA4 | 5A | 5D | 00:04:00 |
| WorkerA5 | 5A | 5D | 00:04:00 |
| WorkerA6 | 5A | 5D | 00:04:00 |
| ⋮ | ⋮ | ⋮ | ⋮ |
| WorkerB1 | 5B | 5C | 00:02:00 |
| WorkerB2 | 5B | 5E | 00:04:00 |
| WorkerB3 | 5B | 5E | 00:04:00 |
| WorkerC1 | 5C | 5F | 00:04:00 |
| WorkerC2 | 5C | 5F | 00:04:00 |
| WorkerC3 | 5C | 5F | 00:04:00 |
| ⋮ | ⋮ | ⋮ | ⋮ |

Fig. 30

WORKER XX

PLEASE MOVE FROM WORK SECTION 5F TO WORK
   SECTION 5H.
   PLEASE MOVE ON ROUTES 5F→5E→5H.

>> I CAN MOVE FROM NOW
      I CANNOT MOVE

Fig. 31

| MOVEMENT SECTION NAME | MOVEMENT TIME (MINUTE) | AVERAGE MOVEMENT TIME (MINUTE) |
|---|---|---|
| 5A⇔5B | 02:00 | 02:10 |
| 5B⇔5C | 02:00 | 02:01 |
| 5A⇔5D | 04:00 | 04:10 |
| 5B⇔5E | 04:00 | 04:10 |
| 5C⇔5F | 04:00 | 05:21 |
| 5D⇔5E | 02:00 | 01:59 |
| 5E⇔5F | 02:00 | 02:00 |
| 5D⇔5G | 04:00 | 04:33 |
| 5E⇔5H | 04:00 | 04:01 |
| 5F⇔5I | 08:00 | 08:30 |
| 5G⇔5H | 02:00 | 02:05 |
| 5H⇔5I | 08:00 | 08:10 |

Fig. 32

| WORKER NAME | MOVEMENT INSTRUCTION | SCHEDULED MOVEMENT TIME (MINUTE) | ACCEPTANCE | MOVEMENT START TIME | MOVEMENT END TIME | ACTUAL WORKING MOVEMENT TIME (MINUTE) |
|---|---|---|---|---|---|---|
| WorkerA1 | 5A⇒5B | 02:00 | REFUSAL | | | |
| WorkerA2 | 5A⇒5B | 02:00 | | 17:00:25 | 17:02:35 | 02:10 |
| WorkerA3 | 5A⇒5D | 04:00 | | 17:02:15 | 17:06:20 | 04:05 |
| WorkerA4 | 5A⇒5D | 04:00 | | 17:00:34 | 17:04:39 | 04:05 |
| WorkerA5 | 5A⇒5D | 04:00 | REFUSAL | | | |
| WorkerA6 | 5A⇒5D | 04:00 | | 17:01:55 | 17:05:15 | 04:20 |
| ... | ... | ... | ... | ... | ... | ... |
| WorkerB1 | 5B⇒5C | 02:00 | REFUSAL | | | |
| WorkerB2 | 5B⇒5E | 04:00 | | 17:01:21 | 17:03:22 | 02:10 |
| WorkerB3 | 5B⇒5E | 04:00 | | 17:02:11 | 17:06:21 | 04:10 |
| WorkerC1 | 5C⇒5F | 04:00 | | 17:01:26 | 17:06:36 | 05:10 |
| WorkerC2 | 5C⇒5F | 04:00 | | 17:01:49 | 17:07:22 | 05:33 |
| WorkerC3 | 5C⇒5F | 04:00 | | 17:01:31 | 17:06:51 | 05:20 |
| ... | ... | ... | ... | ... | ... | ... |

WORK MANAGEMENT DEVICE, WORK MANAGEMENT METHOD, AND PROGRAM STORAGE MEDIUM

This application is a National Stage Entry of PCT/JP2018/010939 filed on Mar. 20, 2018, which claims priority from Japanese Patent Application 2017-072059 filed on Mar. 31, 2017, the contents of all of which are incorporated herein by reference, in their entirety.

TECHNICAL FIELD

The present invention relates to a technique for improving work efficiency in a whole of a work process involving a plurality of workers.

BACKGROUND ART

In recent years, development of IT is under way in a work site such as a factory or a warehouse. For example, when a warehouse is taken as an example, there is a work assist system such as a warehouse management system (WMS) or a digital picking system (DPS). In addition to such a work assist system, introduction of a work mechanization system such as a material handler including a conveyer and a robot arm, and an automatic warehouse system is also under way. Introduction of a work assist system and also introduction of a work mechanization system in addition enable an advantageous effect such as reduction of work mistakes and improvement of work efficiency to be acquired. However, in many factories and warehouses, a percentage of manual work to a whole work is still high.

FIG. 33 is a diagram illustrating a picking process being one of delivery processes in a warehouse. For example, in a process of picking a single article (a bulk article), a picking method called relay-type picking is utilized. In the relay-type picking, a shelf 1 is disposed along a conveyer 3, and one work line is formed. An article to be delivered is stored on the shelf 1. The work line is divided into a plurality of work sections, and a worker 2 is allocated to each work section. In the example illustrated in FIG. 33, the work line is divided into two work sections 5A and 5B, and the worker 2 is allocated to each work section. Then, when containers 4a and 4b are disposed in the work sections 5A and 5B by the conveyer 3, the worker 2 takes out an article according to contents of an order from the shelf 1, and then puts the article in the container 4a or 4b.

Work efficiency in each of the work sections 5A and 5B changes depending on contents of an order, a physical condition of the worker 2, a state of a work site such as a state where there are many temporarily placed objects preventing movement of the worker 2, and the like. For example, FIG. 34 illustrates an example of a relation between daily changes in a work amount and the number of workers in one work section, and work efficiency. FIG. 35 illustrates an example of a relation between daily changes in a work amount and the number of workers in another work section, and work efficiency. In these examples, the workers work in three shifts based on three time periods A to C, and the number of the workers 2 changes depending on time. Moreover, a work amount also changes depending on time. In the examples of FIGS. 34 and 35, work efficiency changes depending on changes in the number of the workers 2 and a work amount.

FIGS. 36 and 37 each illustrate an example of a relation between a remaining work amount and work efficiency in a picking process in a situation different from a situation where the relation examples illustrated in FIGS. 34 and 35 are acquired. In short, each of the relation examples illustrated in FIGS. 36 and 37 is an example of a relation between a remaining work amount and work efficiency in a situation where a work order is irregularly input as a batch, and work sections differ between the examples of FIGS. 36 and 37.

In the examples of FIGS. 36 and 37, work efficiency mainly changes according to contents of a work order. Thus, work efficiency is largely constant from a point where a work order is input as a batch until the work order is ended, and when a next work order is input, work efficiency changes to work efficiency according to contents of the input work order.

In view of this, being able to predict what kind of work order is input at which timing enables previous formation of a work plan and securing of personnel, as well as scheduling by a method such as mathematical optimization considering work efficiency.

However, for example, in logistics industry or the like, a demand made on a day depends on various factors such as a season, weather, a temporary boom resulting from diffusion of information on the Internet, and a region, and therefore, a work amount and work contents are substantially unpredictable. Further, work efficiency also involves a factor such as a physical condition of a worker, variation in the number of workers due to a sudden vacancy, and a situation at a work site, the factor is difficult to be predicted, and thus, accurate prediction of work efficiency is difficult.

Since prediction of work efficiency is thus difficult, a situation arises where work efficiency as planned is not acquirable even by scheduling in such a way as to increase work efficiency. Scheduling that considers work efficiency is thus difficult, and therefore, allocating a worker according to a situation in a work site is important in order to increase work efficiency. To be specific, for example, it is known that, when a workload in either one of the work section 5A or 5B in the picking process as illustrated in FIG. 33 becomes greater than a workload in the other, work efficiency of the whole process is decreased. In short, since the containers 4a and 4b in the work sections 5A and 5B are on the same conveyer 3, a decrease of work efficiency in the one work section resulting from an increase of a workload leads to a decrease of work efficiency in the other work section. In order to avoid such a decrease of work efficiency, there are suggested a large number of approaches to equalizing a workload in such a way that workloads in the work sections 5A and 5B do not vary.

As a method of equalizing a workload, there is a method of optimizing allocation of a worker to a work section. In short, work progress in each work section can be uniformed by altering allocation of a worker depending on a workload. In the alteration of allocation of a worker, for example, the number of workers allocated to each work section is altered, and a particular worker is exchanged. Contents of a work order, a physical condition of a worker, a state in a work site, and the like change day by day, status of a workload and work progress change, and therefore, allocation of a worker to each work section is dynamically performed depending on a change of a workload (work efficiency).

By the way, when allocation of a worker to a work section is dynamically performed, a movement distance between work sections matters. In short, when a worker moves between work sections, a cost (i.e., a loss negatively affecting a work efficiency) such as a time according to a movement distance and fatigue of a worker is incurred. Thus, when movement alone is considered, work efficiency can be increased, but a degree of a cost resulting from movement differs depending on whether a work section being a movement destination is near or far, and work efficiency may be decreased due to movement depending on the cost. Accordingly, determination of whether or not to rearrange a worker changes depending on a degree of a movement cost. Note that a cost referred to herein is an undesirable index resulting from not only time but also movement, and is, for example, a temporal, physical, or financial loss.

Note that PTL 1 suggests a method of calculating required workers for each work from ease of the work, and determining the number of required workers. PTL 2 suggests a method of calculating the number of standard workers required for a production line in consideration of standard production capacity information and a skill level of each worker, and allocating the workers, based on a calculation result. PTL 3 discloses a production plan evaluation device considering work efficiency in a movement time and group-unit. The device calculates a work time per unit period, based on information including a work time including a movement time, a combination of workers for a group composed of one or more workers, and a work time of a worker. A method presented in PTL 4 considers progress of a project, and calculates a difference between a profit acquired by assigning a worker to a certain project, and a cost of suspending a work originally performed by the worker resulting from assigning to the project. Then, based on a result of the calculation, the method in PTL 4 determines a worker in such a way as to maximize a profit. PTL 5 presents a method of calculating a movement cost, and determining a movement route of a worker, based on a result of the calculation.

CITATION LIST

Patent Literature

[PTL 1] Japanese Patent Application Laid-Open Publication No. 2001-092883
[PTL 2] Japanese Patent Application Laid-Open Publication No. 2008-004053
[PTL 3] Japanese Patent No. 5194708
[PTL 4] Japanese Patent Application Laid-Open Publication No. 2004-280694
[PTL 5] Japanese Patent Application Laid-Open Publication No. 2006-209383

SUMMARY OF INVENTION

Technical Problem

As described above, when allocation of a worker to a work section is altered, the worker moves, and thus, a cost (hereinafter, also referred to as a movement cost) resulting from the movement is incurred. In short, in spite of an attempt to improve work efficiency in a work section by altering allocation of a worker, work efficiency may be decreased by incurrence of a movement cost. In order to avoid such a case, further increase work efficiency, and thereby acquire a profit, it is necessary to appropriately evaluate a profit and a movement cost when allocation of a worker to a work section is altered. As a movement cost, a movement time per movement and an expense for the movement are used, for example. Moreover, as an evaluation axis (profit) to be compared with a movement cost, throughput per unit time, a profit per unit time, and work efficiency per unit time are used.

Herein, a specific example is described. For example, suppose that a worker P works in two areas A and B. It is assumed that the worker P is able to acquire a profit of 300 yen per hour by a work in the area A. Further, it is assumed that the worker P is able to acquire a profit of 500 yen per hour in the other area B. However, it is assumed that a toll of 300 yen is taken per movement between the areas A and B. For ease of description, a distance between the areas A and B is sufficiently short, and a movement time between the areas A and B is significantly short and therefore neglected. Given that the worker P works for 1 hour in the area A, a profit to be acquired is 300 yen×1 hour=300 yen.

Assuming that the worker P then moves from the area A to the area B, and works for 1 hour in the area B, the worker P acquires an amount of money in which the toll of 300 yen resulting from the movement between the areas A and B is subtracted from the profit of 500 yen resulting from working for 1 hour in the area B. In short, the worker P acquires 500 yen×1 hour−300 yen=200 yen. On the other hand, when the worker P does not move from the area A to the area B, and still works for 1 hour in the area A, the worker P is able to acquire a profit of 300 yen for 1 hour in the area A. In short, a profit to be acquired by the worker P is decreased by the movement.

However, when the worker P moves from the area A to the area B and works for 2 hours in the area B, a profit becomes 500 yen×2 hours−300 yen=700 yen, whereas, when the worker P works for 2 hours without moving from the area A, a profit becomes 300 yen×2 hours=600 yen. In short, in this case, the worker P becomes able to acquire a higher profit by moving than when not moving. In other words, the worker P is able to acquire a higher profit by moving to the area B when moving from the area A to the area B and working for 1.5 hours or more in the area B, and the worker P is able to acquire a higher profit without moving when working only for less than 1.5 hours in the area B.

However, in the real world, work efficiency changes, and therefore, there is no guarantee that work efficiency (e.g., a profit (yen) per unit time) in each of the areas A and B lasts for 1.5 hours or more. In short, work efficiency (profit) may become 500 yen or 200 yen 1 hour later in the area A, and predicting such a change of work efficiency is difficult.

Since predicting a change of work efficiency is thus difficult, the methods presented in Cited Literatures 1 to 5 do not consider a change of work efficiency. However, considering that a change of efficiency can occur, there seems to be room for improvement in a method concerning rearrangement of a worker.

The present invention has been made in order to solve the problems described above. Namely, a main object of the present invention is to provide a technique being capable of arranging a worker in consideration of a change of work efficiency in such a way that higher work efficiency is acquirable in a whole of a work process.

Solution to Problem

A work management device according to an exemplary aspect of the present invention includes: index acquisition means for acquiring, for each work section of a plurality of work sections divided from a whole region in a work range, a work evaluation index which is calculated, based on work history of a work performed by a worker being a person or an object performing the work; duration time acquisition means for acquiring, by calculating or reading out, information about a duration time being a calculated value or a setting value for which a state is expected to continue, the state being a state where the work evaluation index based on a work status of the worker is the work evaluation index calculated by the index acquisition means, in the work section; cost acquisition means for acquiring information about a cost being a loss incurred when the worker moves between the work sections; and determination means for determining, based on an estimated work amount and the cost, arrangement of the workers in the plurality of work sections in such a way as to increase work efficiency in the whole of the work range, the estimated work amount being estimated based on the work evaluation index and being an amount of a work performed by the worker until the duration time is elapsed in the work section.

A work management method according to another exemplary aspect of the present invention includes: acquiring, for each work section of a plurality of work sections divided from a whole region in a work range, a work evaluation index which is calculated, based on work history of a work performed by a worker being a person or an object performing the work; acquiring, by calculating or reading out, information about a duration time being a calculated value or a setting value for which a state is expected to continue, the state being a state where the work evaluation index based on a work status of the worker is the work evaluation index calculated, in the work section; acquiring information about a cost being a loss incurred when the worker moves between the work sections; and determining, based on an estimated work amount and the cost, arrangement of the workers in the plurality of work sections in such a way as to increase work efficiency in the whole of the work range, the estimated work amount being estimated based on the work evaluation index and being an amount of a work performed by the worker until the duration time is elapsed in the work section.

A computer readable storage medium according to still another exemplary aspect of the present invention records thereon a program causing a computer to perform processes including: acquiring, for each work section of a plurality of work sections divided from a whole region in a work range, a work evaluation index which is calculated, based on work history of a work performed by a worker being a person or an object performing the work; acquiring, by calculating or reading out, information about a duration time being a calculated value or a setting value for which a state is expected to continue, the state being a state where the work evaluation index based on a work status of the worker is the work evaluation index calculated, in the work section; acquiring information about a cost being a loss incurred when the worker moves between the work sections; and determining, based on an estimated work amount and the cost, arrangement of the workers in the plurality of work sections in such a way as to increase work efficiency in the whole of the work range, the estimated work amount being estimated based on the work evaluation index and being an amount of a work performed by the worker until the duration time is elapsed in the work section.

Advantageous Effects of Invention

The present invention is capable of arranging a worker in consideration of a change of work efficiency in such a way that higher work efficiency is acquirable in a whole of a work process.

BRIEF DESCRIPTION OF DRAWINGS

FIG. 5 is a diagram illustrating one example of section data.

FIG. 6 is a diagram illustrating one example of a work evaluation index for each worker.

FIG. 7 is a diagram illustrating one example of a remaining work amount in a work section.

FIG. 11 is a diagram illustrating an example of an input time of a batch and an input amount thereof.

FIG. 16 is a diagram illustrating one example of a work evaluation index for each work section.

FIG. 17 is a diagram illustrating one example of a required work time for each work section when the work management device according to the second example embodiment is applied to a case where a plurality of workers are allocated for each work section.

FIG. 18 is a diagram illustrating one example of movement contents of each worker when allocation is performed based on a work evaluation index of each worker in a case where a plurality of workers are allocated for each work section.

FIG. 25 is a diagram illustrating one example of movement cost data when three or more work sections are considered.

FIG. 26 is a diagram illustrating one example of a work item performed in a work section.

FIG. 27 is a diagram illustrating one example of a scheduled input time of a batch to each work section when a work process (a work range) is divided into three or more work sections.

FIG. 28 is a diagram illustrating one example of allocation of a worker to each work section when the work management device according to each of the second to fourth example embodiments is applied to a case where a work process (a work range) is divided into three or more work sections.

FIG. 29 is a diagram illustrating one example of allocation of each worker when the work management device according to each of the second to fourth example embodiments is applied to a case where a work process (a work range) is divided into three or more work sections.

FIG. 30 is a diagram illustrating a display example of a display for instructing a work manager or a worker about movement contents.

FIG. 31 is a diagram illustrating one example of a movement time between work sections calculated based on actually measured data.

FIG. 32 is a diagram illustrating another example of allocation of a worker to each work section when the work management device according to each of the second to fourth example embodiments is applied.

EXAMPLE EMBODIMENT

Example embodiments according to the present invention are described below by use of the drawings.

By the way, the present inventor has noticed the following matter while considering a method of allocating (arranging) a worker to each work section that is capable of increasing work efficiency of a whole of a work process when a work process is divided into a plurality of work sections.

Figure 34:
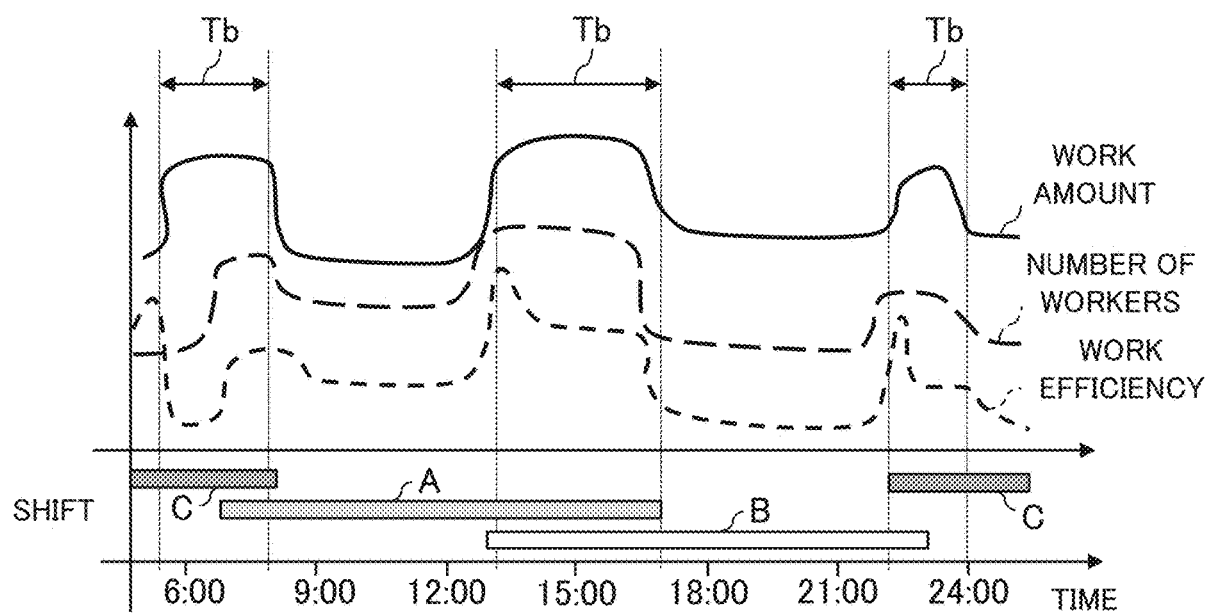
FIG. 34 is a diagram illustrating one example of a relation among a work amount, the number of workers, and work efficiency in one work section.
Figure 35:
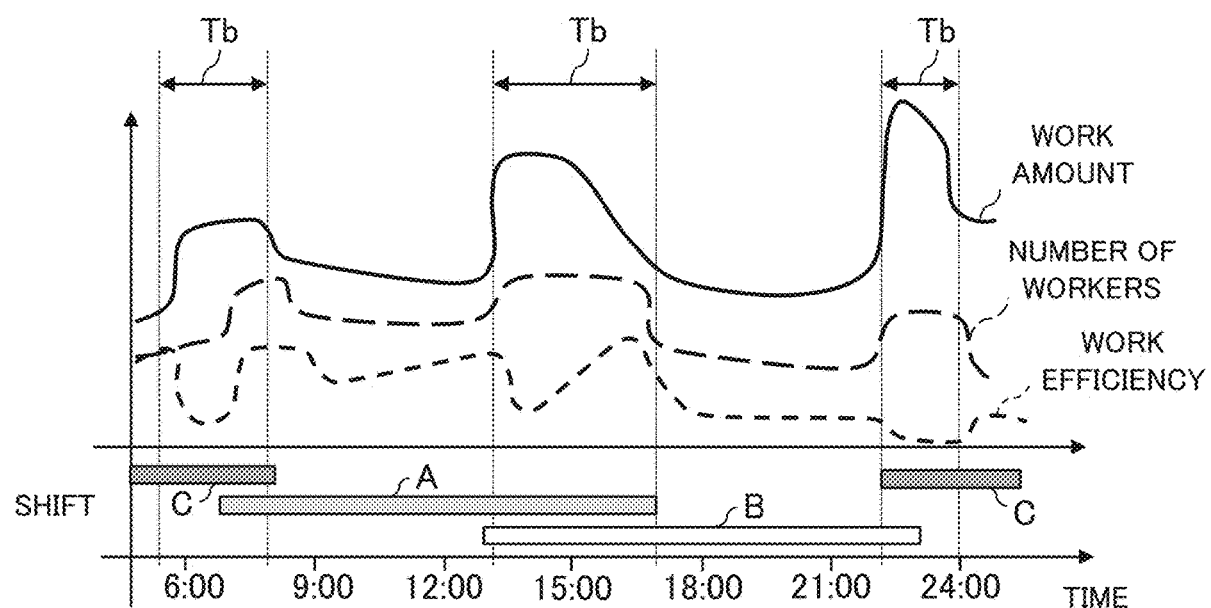
FIG. 35 is a diagram illustrating another example of a relation among a work amount, the number of workers, and work efficiency in one work section.
Figure 36:
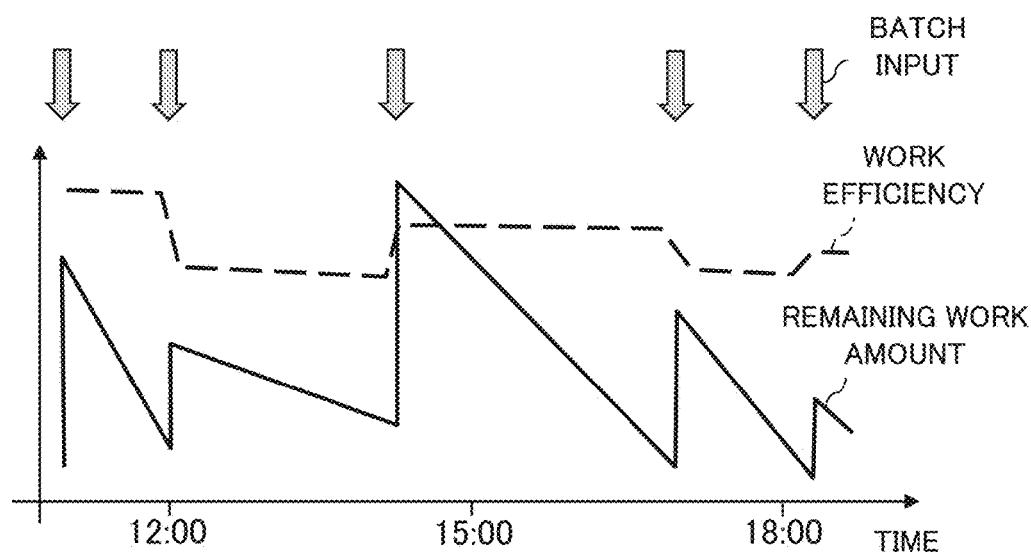
FIG. 36 is a diagram illustrating still another example of a relation among a work amount, the number of workers, and work efficiency in one work section.
Figure 37:
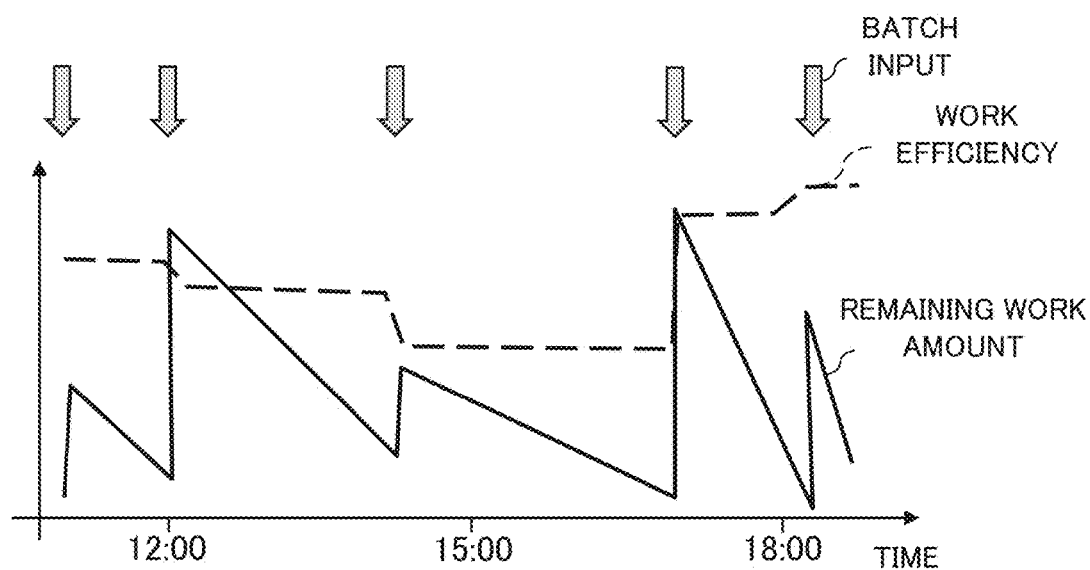
FIG. 37 is a diagram illustrating yet another example of a relation among a work amount, the number of workers, and work efficiency in one work section.

Namely, work efficiency involves a factor that is difficult to be predicted, and thus, accurate prediction of work efficiency is difficult. However, when work efficiency can be calculated (acquired), it is possible to estimate how long the work efficiency lasts, in many cases. For example, in a picking process as described above, a change of work efficiency is made by a start point and an end point of a busy time period Tb and by a timing at which a worker is shifted, in the cases illustrated in FIGS. 34 and 35. Moreover, in the cases illustrated in FIGS. 36 and 37, a change of work efficiency is made by a timing of batch input. In such cases, a timing at which work efficiency changes can be estimated. Further, in the specific example described above, it is possible to determine that a worker is to move in order to acquire higher efficiency (profit) when a state where efficiency (profit) in an area A is 300 yen and efficiency (profit) in an area B is 500 yen continues for 1.5 hours or more.

In consideration of the above description, it is possible to determine whether or not higher efficiency is acquirable when a worker moves to an area (a work section) with high efficiency at a certain time point than when the worker does not move. In short, information required for determination of whether or not movement is effective includes an evaluation value (e.g., work efficiency (profit)) in each area (the work section), a time width (a duration time of a situation) indicating a length of a period for which evaluation is performed, and a cost concerning movement (a cost (a loss) per movement). Whether or not movement is effective is determined by calculating and comparing, based on the information, profits when moving and when not moving, and work efficiency is improved by arranging a worker, based on a result of the determination.

Based on such a matter, the present inventor has derived the present invention.

First Example Embodiment

Figure 1:
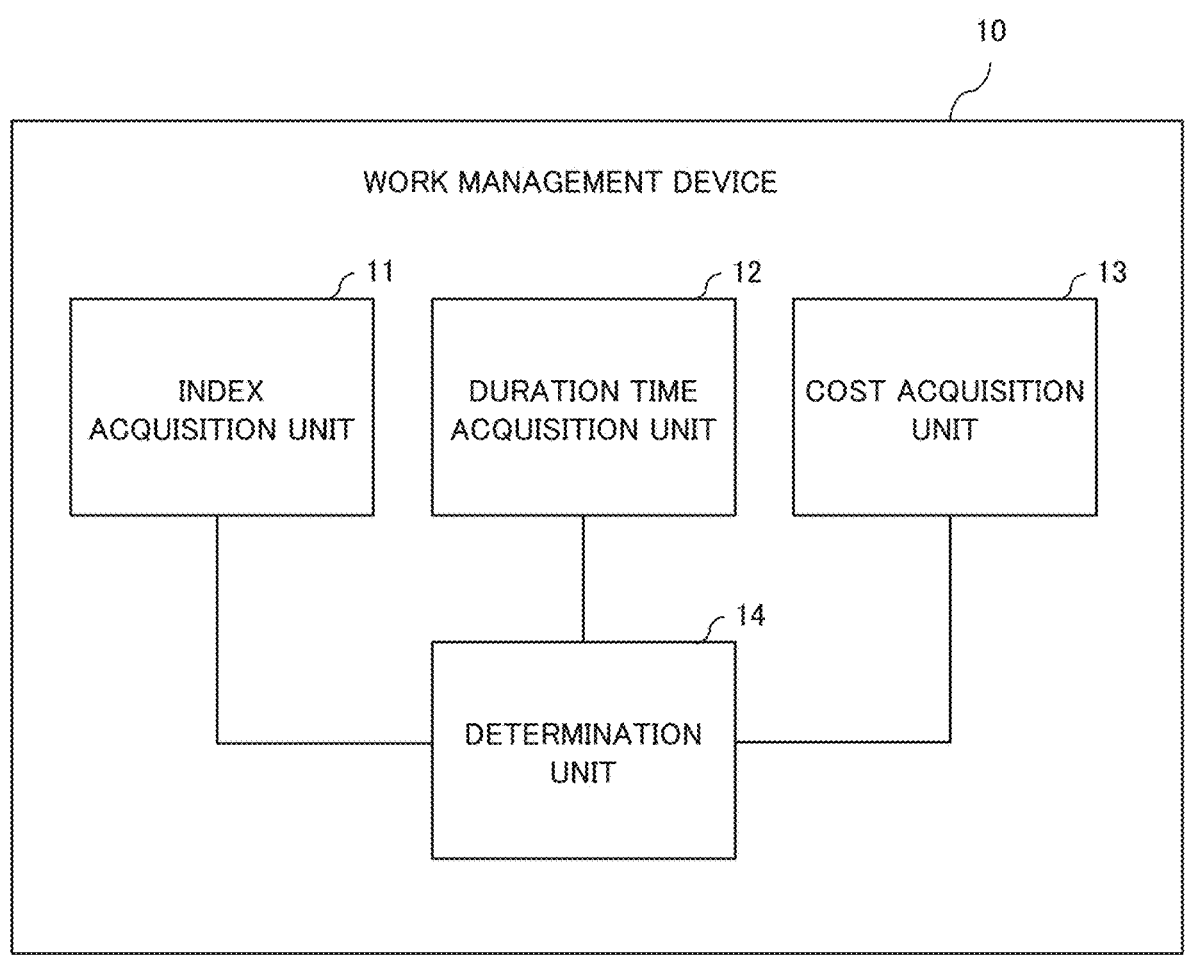
FIG. 1 is a block diagram illustrating a configuration of a work management device according to a first example embodiment of the present invention in a simplified form.

FIG. 1 is a block diagram illustrating a configuration of a work management device according to a first example embodiment of the present invention in a simplified form. A work management device 10 has a function of determining, when a whole region in a work range is divided into a plurality of work sections, how to arrange a worker (a person or an object performing a work) to each work section, in order to increase work efficiency in the whole region in the work range. Namely, the work management device 10 according to the first example embodiment includes an index acquisition unit 11, a duration time acquisition unit 12, a cost acquisition unit 13, and a determination unit 14.

The index acquisition unit 11 has a function of acquiring, for each work section, a work evaluation index (e.g., work efficiency) calculated based on work history of a work performed by a worker. The duration time acquisition unit 12 has a function of acquiring information about a duration time for which a state, in which a work evaluation index based on a work status of the worker in a work section is the work evaluation index acquired by the index acquisition unit 11, is expected to continue. The cost acquisition unit 13 has a function of acquiring information about a cost being a loss incurred when the worker moves between work sections. The determination unit 14 has a function of acquiring an estimated work amount being estimated based on the work evaluation index and being an amount of a work performed by the worker until the duration time is elapsed in the work section. Further, the determination unit 14 has a function of determining, based on the acquired work amount and the cost acquired by the cost acquisition unit 13, arrangement of workers in the plurality of work sections in such a way as to increase work efficiency in the whole of the work range.

The work management device 10 according to the first example embodiment is able to arrange a worker in such a way that higher work efficiency is acquirable in a whole of a work process, in consideration of a change of work efficiency. Namely, a work evaluation index utilized by the work management device 10 according to the first example embodiment to determine arrangement of a worker is an index calculated based on work history, and a duration time of the work evaluation index can be estimated easily based on work contents or the like. By using such information, the work management device 10 determines arrangement of a worker, based on work status in which a change of the work evaluation index (work efficiency) can be estimated easily. Thus, the work management device 10 is able to arrange a worker in such a way that higher work efficiency is acquirable in a whole of a work process without being adversely affected by a change of work efficiency.

Second Example Embodiment

A second example embodiment according to the present invention is described below.

DESCRIPTION OF CONFIGURATION

Figure 2:
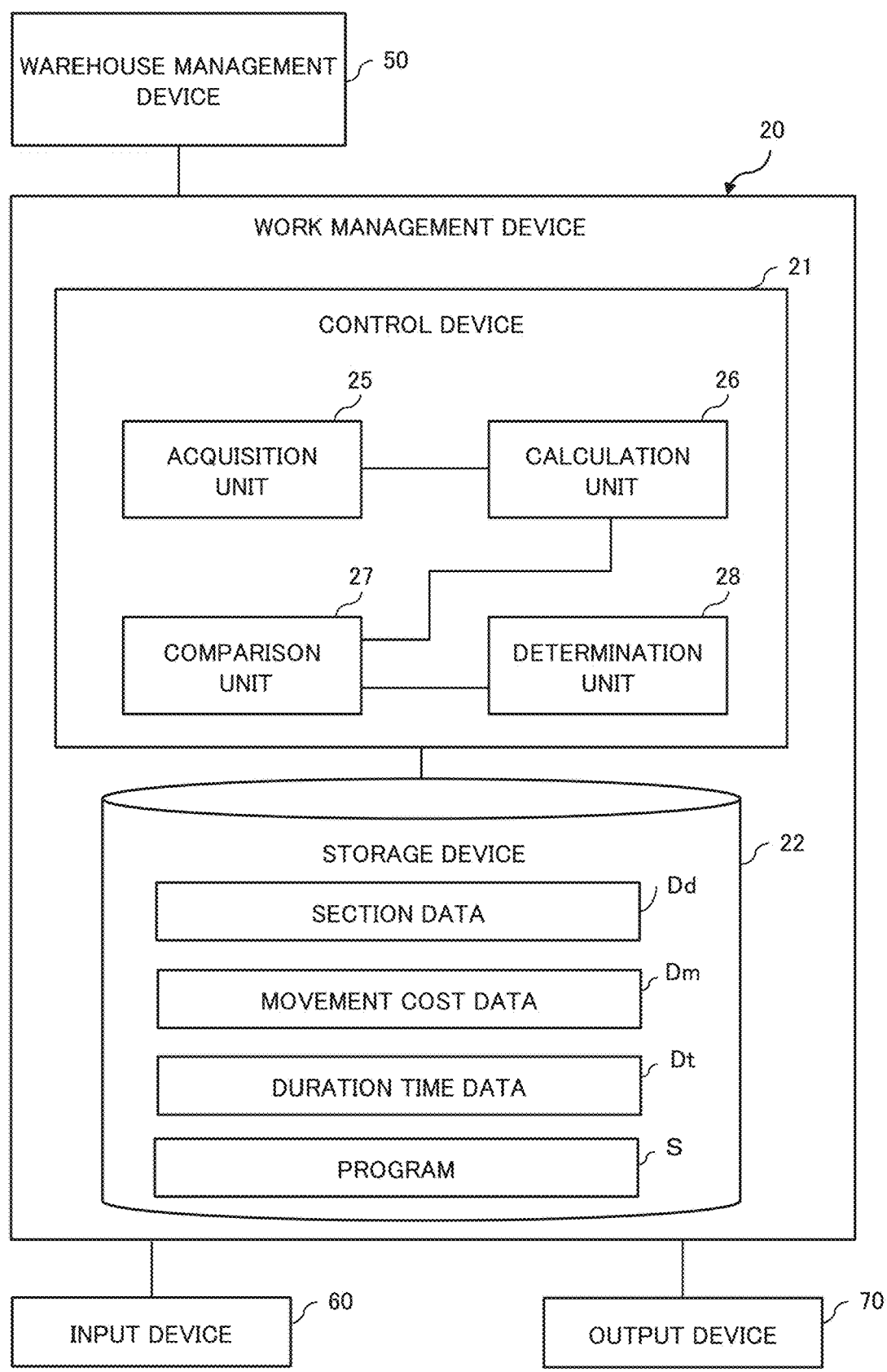
FIG. 2 is a block diagram illustrating a configuration of a work management device according to a second example embodiment of the present invention in a simplified form.
Figure 33:
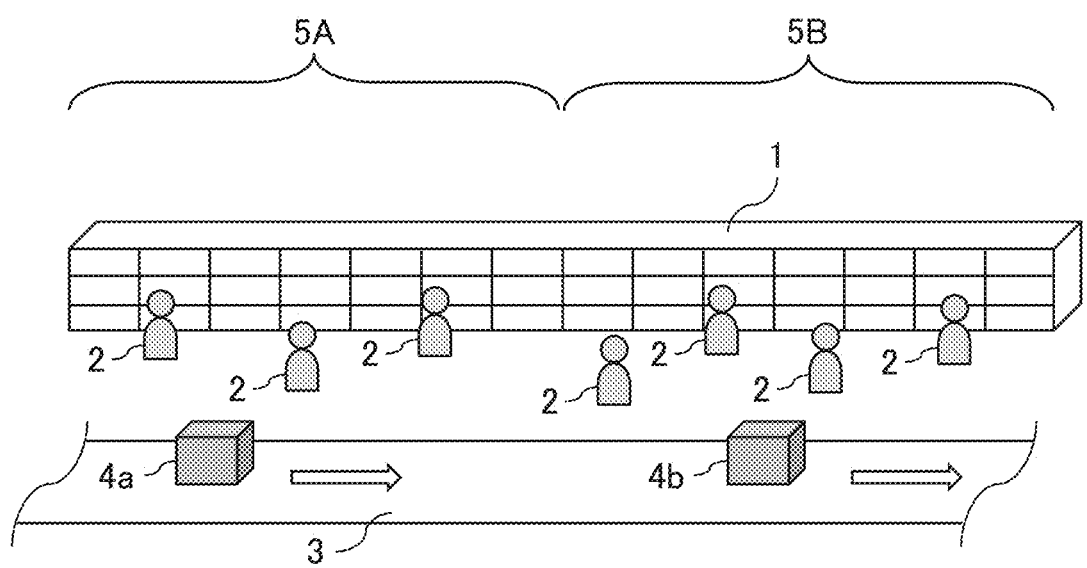
FIG. 33 is a diagram for describing one example of a work process.

FIG. 2 is a block diagram illustrating a configuration of a work management device according to a second example embodiment together with a warehouse management device in a simplified form. A work management device 20 according to the second example embodiment has a function concerning arrangement management of a worker in a picking process in a delivery work in a warehouse. In the picking process of the work management device 20, in which arrangement management of a worker is performed, a picking method called relay-type picking is utilized, for example. In the relay-type picking method, as described above, a shelf 1 is disposed along a conveyer 3 as illustrated in FIG. 33, and one work line is formed. An article to be delivered is stored on the shelf 1. The work line is divided into a plurality of work sections, and a worker 2 is allocated to each work section. In the example illustrated in FIG. 33, the work line is divided into two work sections 5A and 5B, and the worker 2 is allocated to each work section. Then, when containers 4a and 4b are disposed in the work sections 5A and 5B by the conveyer 3, each worker 2 takes out an article according to contents of an order from the shelf 1, and then puts the article in the container 4a or 4b. According to the second example embodiment, a work is input to each of the work sections 5A and 5B, as a batch, at each set time interval.

The work management device 20 is connected to a warehouse management device 50. The warehouse management device 50 is a device (a computer) having a function of performing storage and delivery management, inventory management, and work assistance, for an item (e.g., an article such as a merchandise or a component) handled in the warehouse. For example, as one function of inventory management provided by the warehouse management device 50, there is state management of an item to be delivered. In this management, the warehouse management device 50 stores, for example, warehouse work management information. The warehouse work management information is information about an item to be delivered under a delivery instruction, and is information in which an item class, the number of items, storage position information, and work state information (e.g., information representing completion of picking) are associated with one another for each item to be delivered. The storage position information in the warehouse work management information is, for example, information for identifying a shelf or a section being a position in which an item is stored.

The warehouse management device 50 adds or updates the warehouse work management information, suitably, when an item to be delivered is added or alteration of the work state information (e.g., picking completion or inspection completion) is occurred. Note that the warehouse management device 50 acquires the work state information by utilizing, for example, an information terminal such as a handy terminal.

Moreover, the warehouse management device 50 stores information representing a range of a work section, information representing a time interval at which a work is input to a work section, information representing the number of workers allocated to a work section, information representing, for each worker, an amount of a work and work contents conducted by the worker, and the like. Further, the warehouse management device 50 calculates, based on, for example, work state information of an item to be delivered as described above, a remaining work amount in a work section at each set timing, and stores information representing a calculation result as remaining work amount information.

The work management device 20 is also connected to an input device 60 and an output device 70. The input device 60 is a device with which an operator (e.g., a work manager) of the work management device 20 inputs information to the work management device 20, and is a keyboard, a mouse, a touch panel, and the like. Note that the input device 60 is not limited to one kind, and it is assumed herein that, when a plurality of kinds of input devices are connected to the work management device 20, the input devices are collectively referred to as the input device 60.

The output device 70 is a device which visually or auditorily presents a calculation result by the work management device 20 to a work manager, a worker, and the like, and is a display, a printer, a speaker, and the like. Note that the output device 70 is not limited to one kind, and it is assumed herein that, when a plurality of kinds of output devices are connected to the work management device 20, the output devices are collectively referred to as the output device 70.

The work management device 20 broadly includes a control device 21 and a storage device 22. The storage device 22 is a storage medium which stores various data and a computer program (a program). According to the second example embodiment, the storage device 22 stores section data Dd, movement cost data Dm, duration time data Dt, and a program S.

The section data Dd includes section range information being information representing a range of a work section. The section range information is information for identifying a section range of a space or a logical section range being a unit for managing a worker arranged in a work section. Note that, as section range information based on a logical section range, there is, for example, information (e.g., a process number) for identifying one or a plurality of processes constituting a whole of a work process. For example, in a distribution warehouse, when a plurality of works which are in the same physical section range but are different works such as a work of picking a merchandise and a work of replenishing a merchandise are performed, each work is regarded as one logical section, and a different section range information is associated with each work. According to the second example embodiment, the section data Dd are acquired from the warehouse management device 50, and stored in the storage device 22.

One example of the section data Dd is represented in FIG. 5. In this example, in the section data Dd, information about a "section name" is associated with information about a "section range". The "section name" is information for identifying a work section, and, in this example, "5A" and "5B" are set as section names. The "section range" is information representing a range of a work section associated with the "section name", and, in this example, a work floor ("fifth floor"), a work line identification name ("single article first line"), and a shelf number ("shelfs 1-6" or a "shelfs 7-12") are associated with one another and set as a section range.

The movement cost data Dm is information about a movement cost incurred when a worker moves from a work section where the worker is arranged, to another work section. A movement cost is a quantified value of a temporal loss resulting from movement or physical fatigue of a worker resulting from movement, or a quantifiable physical amount such as a distance related to movement. According to the second example embodiment, a movement cost is an average time for respective workers to move between work sections. Note that there is also assumed a case where a movement cost changes depending on a direction of movement (a movement path) as is a case that a movement cost when a worker moves from the work section 5A to the work section 5B is different from a movement cost when a worker moves from the section 5B to the section 5A, for example. In other words, according to the second example embodiment, a movement cost is set for each movement path of a worker.

Figures 8, 9, 10:
FIG. 8 is a diagram topologically illustrating a linkage of a plurality of work sections constituting a work process.
FIG. 9 is a diagram illustrating one example of movement cost data.
FIG. 10 is a diagram illustrating one example of duration time data.

A topology representing a linkage between the work section 5A and the work section 5B is illustrated in FIG. 8. In FIG. 8, each of the work sections 5A and 5B is represented by a node, and these nodes are linked by an edge. It represents that movement between the work sections 5A and 5B is possible. In FIG. 9, one example of the movement cost data Dm is illustrated. In this example, in the movement cost data Dm, information about a "movement section name" is associated with information about a "required movement time".

The movement cost data Dm is stored in the storage device 22 by, for example, a device operator by utilizing the input device 60.

The duration time data Dt is information about a time for which similar work efficiency lasts (continues). According to the second example embodiment, as described above, a work is input to each work section at each set time interval as a batch. Since work efficiency changes according to work contents of a batch, a duration time for which similar work efficiency lasts is a scheduled input time interval of a batch. In short, a scheduled input time interval of a batch is stored in the storage device 22 as the duration time data Dt. Note that input of a batch is, as described above, a timing at which work efficiency changes, and thus, it can be also said that the duration time data Dt is information representing a change timing at which work efficiency changes. Moreover, an operator may store the duration time data Dt in the storage device 22 by operating the input device 60, or information about a scheduled input time interval of a batch stored in the warehouse management device 50 may be taken in from the warehouse management device 50 and stored in the storage device 22.

One example of the duration time data Dt is illustrated in FIG. 10. In this example, in the duration time data Dt, information about a "section name" is associated with information about a "batch input interval".

The control device 21 includes a central processing unit (CPU), and is able to have the following function by reading out and executing the program S in the storage device 22. In short, the control device 21 includes, as functional units, an acquisition unit 25, a calculation unit 26, a comparison unit 27, and a determination unit 28.

The acquisition unit 25 has a function of acquiring information from the warehouse management device 50. For example, the warehouse management device 50 stores section range information representing a range of a work section. The acquisition unit 25 acquires section range information from the warehouse management device 50, and stores the acquired section range information in the storage device 22 as the section data Dd. Moreover, the acquisition unit 25 acquires the warehouse management device information at each set timing.

The calculation unit 26 has a function of calculating a work evaluation index for each work section based on work history in a most recent set evaluation period. In other words, according to the second example embodiment, the calculation unit 26 has a function as an index acquisition unit which acquires a work evaluation index. The work evaluation index is information according to work efficiency representing work amount performed per preset unit time.

For example, when the warehouse management device 50 stores information about a work evaluation index for each work section, the calculation unit 26 acquires the work evaluation index for each work section from the warehouse management device 50. Alternatively, when the warehouse management device 50 stores information about a work evaluation index for each worker, the calculation unit 26 may acquire the work evaluation index for each worker from the warehouse management device 50, and, acquire, by utilizing the acquired work evaluation index and the section data Dd, the work evaluation index for each work section. Note that a data example of a work evaluation index for each worker is represented in FIG. 6. In this example, in data about a work evaluation index, information about a "worker name", information about a "coverage section name", and information about a "work evaluation index" are associated with one another. Herein, a work amount for each worker per minute is calculated as a work evaluation index, based on work history in a most recent evaluation period (e.g., for 30 minutes). In short, in the example of FIG. 6, a work evaluation index of a worker 1 is 5.0, and a work evaluation index of a worker 2 is 8.0. In this example, it is assumed that quality of each of works in the work sections 5A and 5B is the same, and there is essentially no difference of work efficiency between workers whichever section a worker works in.

Figure 3:
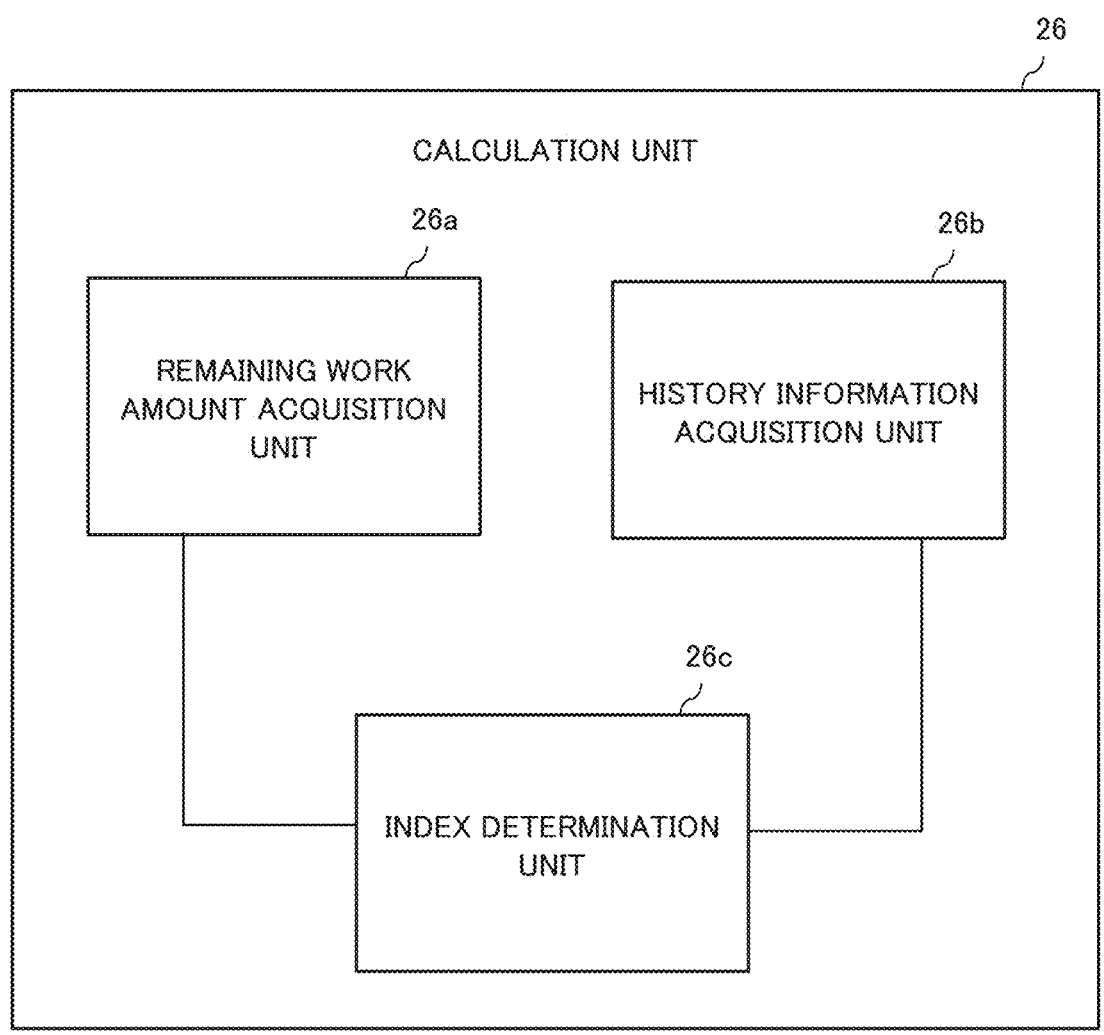
FIG. 3 is a block diagram illustrating one configuration example of a calculation unit according to the second example embodiment in a simplified form.

Furthermore, another configuration example of the calculation unit 26 is illustrated in FIG. 3 by a block diagram. The calculation unit 26 illustrated in FIG. 3 includes a remaining work amount acquisition unit 26a, a history information acquisition unit 26b, and an index determination unit 26c.

The remaining work amount acquisition unit 26a has a function of acquiring, for each work section, information about remaining amount of a work (a remaining work amount) and information about the number of allocated workers, as remaining work amount information, from the warehouse management device 50. One example of remaining work amount information acquired by the remaining work amount acquisition unit 26a is represented in FIG. 7. In this example, information about a "section name", information about a "number of workers", and information about a "remaining work amount" are associated with one another, and set as remaining work amount information. The "section name" is information for identifying a work section, and, herein, a name being coincident with a "section name" in section range information is used. The "number of workers" is information representing the number of workers working in a work section. The "remaining work amount" is information representing the number of remaining works. In the example of FIG. 7, for example, a remaining work amount in the work section 5A at a certain time is 80, and a remaining work amount in the work section 5B is 50.

The history information acquisition unit 26b has a function of calculating (acquiring), as work history information, information including information about a work item and the number of works conducted in a most recent period set as an evaluation period, based on the information acquired from the warehouse management device 50. For example, the history information acquisition unit 26b sorts, based on the section data Dd in the storage device 22 and storage position information included in the warehouse work management information acquired by the acquisition unit 25, information about an item to be delivered included in the warehouse work management information for each work section. Then, the history information acquisition unit 26b calculates, based on a change status of work state information included in the warehouse work management information, a work item and the number of works conducted in a most recent evaluation period for each work section, as work history information.

The index determination unit 26c has a function of calculating (acquiring), based on remaining work amount information and work history information, work efficiency (a work amount processed per unit time) in a work in an evaluation period for each work section, as work evaluation information. Note that the index determination unit 26c may calculate a work evaluation index for each worker, and calculate a work evaluation index for each work section by utilizing the work evaluation index for each worker.

The comparison unit 27 has a function of acquiring the movement cost data Dm and the duration time data Dt from the storage device 22. In other words, according to the second example embodiment, the comparison unit 27 has a function as a cost acquisition unit which acquires the movement cost data Dm being information about a cost (a loss) incurred by movement of a worker. Moreover, the comparison unit 27 has a function of acquiring the duration time data Dt, as a duration time acquisition unit. The duration time data Dt is information about a duration time for which a state, in which a work evaluation index based on a work status is a work evaluation index calculated by the calculation unit 26, is expected to continue.

Furthermore, the comparison unit 27 has a function of calculating (estimating), based on the work evaluation index calculated by the calculation unit 26, the movement cost data Dm, and the duration time data Dt, future indices for a case where a worker is moved and a case where the worker is not moved. Moreover, the comparison unit 27 has a function of comparing the calculated future indices. The future index is an index representing an estimated work amount performed in a work section, in a case where a state of a work evaluation index calculated by the calculation unit 26 continues until the next batch is input.

The determination unit 28 has a function of determining, based on a comparison result of the comparison unit 27, movement instruction contents for a worker in such a way that work efficiency in a whole of a work process (a work line) can be increased.

DESCRIPTION OF OPERATION

Figure 4:
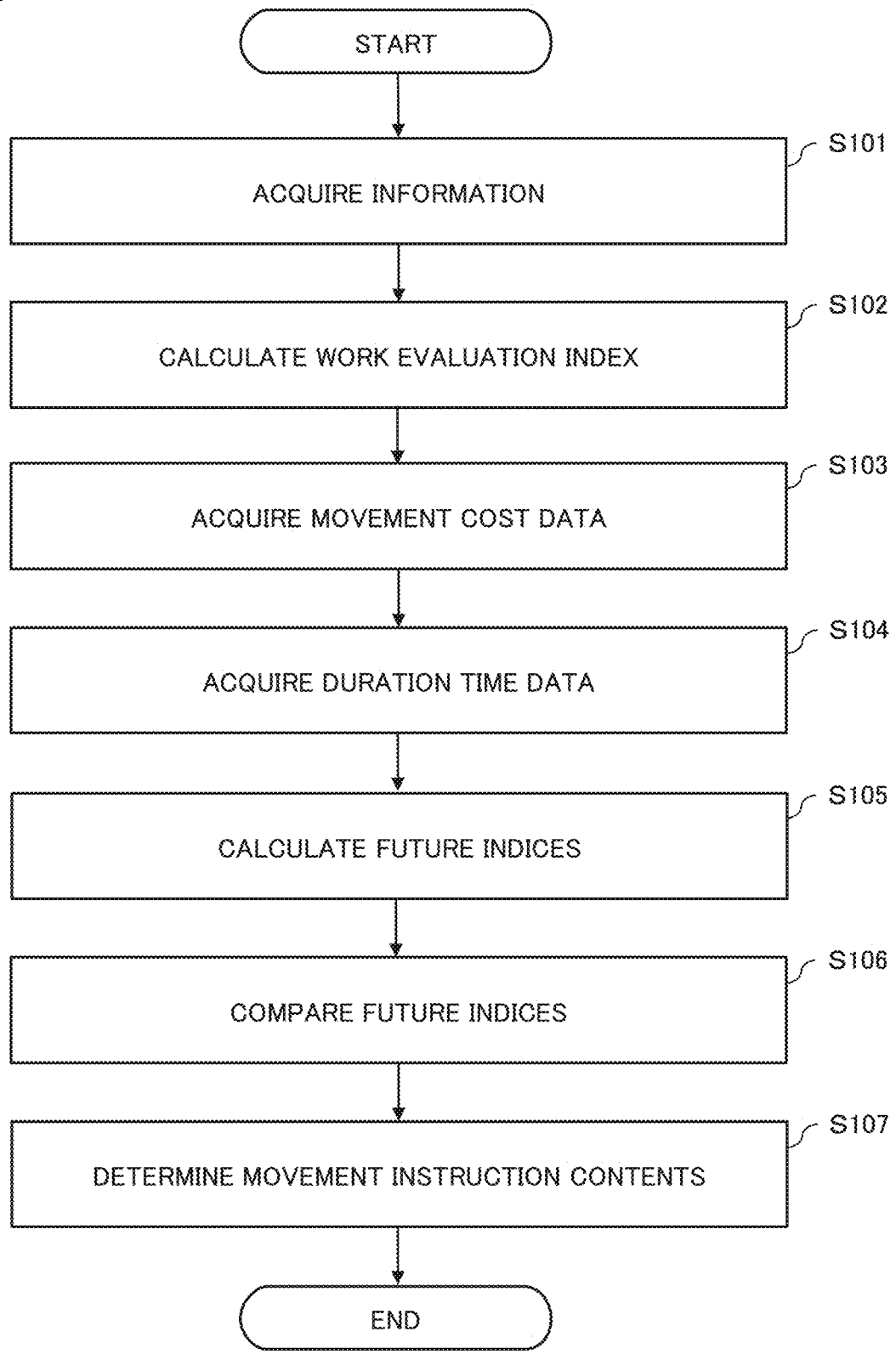
FIG. 4 is a flowchart for describing an operation example of the work management device according to the second example embodiment.

One example of an operation of the work management device 20 is described below, based on a flowchart in FIG. 4.

For example, when the work management device 20 starts an operation, the acquisition unit 25 acquires warehouse work management information and the like from the warehouse management device 50, and stores the warehouse work management information and the like in the storage device 22 (step S101).

Subsequently, the calculation unit 26 acquires (calculates) a work evaluation index for each work section as described above (step S102). Further, the comparison unit 27 acquires movement cost data Dm from the storage device 22 (step S103). Still further, the comparison unit 27 acquires duration time data Dt (step S104). Note that the order of the calculation of a work evaluation index by the calculation unit 26 (the operation in the step S102), the acquisition of the movement cost data Dm by the comparison unit 27 (the operation in the step S103), and the acquisition of the duration time data Dt (the operation in the step S104) can be suitably changed. Moreover, these operations may be executed in parallel.

Thereafter, the comparison unit 27 calculates, based on the acquired work evaluation index, movement cost data Dm, and duration time data Dt, each of future indices for a case where a worker moves and a case where the worker does not move (step S105).

Herein, it is assumed that one worker is allocated to each of the work sections 5A and 5B. In this case, future indices of the work sections 5A and 5B for a case where a worker moves are calculated based on Equation (1-1).

(future index for moving)=(work evaluation index (efficiency) of worker)×(duration time−movement time)  Equation (1-1)

Moreover, future indices for a case where the worker does not move are calculated based on Equation (1-2).

(future index for not moving)=(work evaluation index (efficiency) of worker)×(duration time)  Equation (1-2)

Note that, in each of the future indices for moving and not moving, a remaining work amount in a work section becomes an upper limit value of a future index concerning the work section.

One example of a calculation method of the future index is described by use of a specific numerical value. For example, it is assumed that the worker 1 moves from the work section 5A to the work section 5B, and the worker 2 moves from the work section 5B to the work section 5A. In this case, it is assumed that, for the worker 1, a work evaluation index of the worker 1 is "5.0/minute" (refer to FIG. 6), a duration time is "10 minutes" (refer to FIG. 10), and a movement time is "5 minutes" (refer to FIG. 9). Based on these numerical values and Equation (1-1), a future index of the worker 1 is calculated as in Equation (1-3).

5/minute×(10−5) minutes=25  Equation (1-3)

In short, the future index of the worker 1 is calculated as "25". In this example, the number of workers in each of the work sections 5A and 5B is one, and thus, it can be restated that a future index of the work section 5B being a movement destination of the worker 1 is "25".

Moreover, it is assumed that, for the worker 2, a work evaluation index of the worker 2 is "8.0/minute" (refer to FIG. 6), a duration time is "10 minutes" (refer to FIG. 10), and a movement time is "5 minutes" (refer to FIG. 9). Based on these numerical values and Equation (1-1), a future index of the worker 2 is calculated as in Equation (1-4).

8/minute×(10−5) minutes=40  Equation (1-4)

In short, the future index of the worker 2 (i.e., a future index of the work section 5A) is calculated as "40".

On the other hand, it is assumed that the workers 1 and 2 do not move, the worker 1 remains in the work section 5A, and the worker 2 remains in the work section 5B. For the worker 1, a work evaluation index is "5.0/minute" (refer to FIG. 6), and a duration time is "10 minutes" (refer to FIG. 10), and thus, a future index of the worker 1 is calculated based on Equation (1-2), as in Equation (1-5).

$$5/\text{minute} \times 10 \text{ minutes} = 50 \qquad \text{Equation (1-5)}$$

In short, the future index of the worker 1 (i.e., a future index of the work section 5A) is calculated as "50".

Moreover, for the worker 2, a work evaluation index is "8.0/minute" (refer to FIG. 6), and a duration time is "10 minutes" (refer to FIG. 10), and thus, a future index of the worker 2 is calculated based on Equation (1-2), as in Equation (1-6).

$$8/\text{minute} \times 10 \text{ minutes} = 80 \qquad \text{Equation (1-6)}$$

Based on Equation (1-2), the future index of the worker 2 is calculated as "80", but a remaining work amount of the work section 5B is "50" which is an upper limit value of the future index, and therefore, the future index of the worker 2 (i.e., a future index of the work section 5B) is calculated as "50".

Next, a specific example in which a condition is changed is described. For example, it is assumed that an input interval (i.e., a duration time) of a batch is 15 minutes on another day, and other conditions are similar to conditions in the specific example described above. In this case, when the worker 1 moves from the work section 5A to the work section 5B, a work evaluation index of the worker 1 is "5.0/minute" (refer to FIG. 6), a duration time is "15 minutes", and a movement time is "5 minutes" (refer to FIG. 5). Based on these numerical values and Equation (1-1), a future index of the worker 1 is calculated as in Equation (1-7).

$$5/\text{minute} \times (15-5) \text{ minutes} = 50 \qquad \text{Equation (1-7)}$$

In short, the future index of the worker 1 (i.e., a future index of the work section 5B) is calculated as "50".

Moreover, when the worker 2 moves from the work section 5B to the work section 5A, a work evaluation index of the worker 2 is "8.0/minute" (refer to FIG. 6), a duration time is "15 minutes", and a movement time is "5 minutes" (refer to FIG. 5). Based on these numerical values and Equation (1-1), a future index of the worker 2 is calculated as in Equation (1-8).

$$8/\text{minute} \times (15-5) \text{ minutes} = 80 \qquad \text{Equation (1-8)}$$

In short, the future index of the worker 2 (i.e., a future index of the work section 5A) is calculated as "80".

On the other hand, it is assumed that the workers 1 and 2 do not move, the worker 1 remains in the work section 5A, and the worker 2 remains in the work section 5B. For the worker 1, a work evaluation index is "5.0/minute" (refer to FIG. 6), and a duration time is "15 minutes", and thus, a future index of the worker 1 is calculated based on Equation (1-2), as in Equation (1-9).

$$5/\text{minute} \times 15 \text{ minutes} = 75 \qquad \text{Equation (1-9)}$$

In short, the future index of the worker 1 (i.e., a future index of the work section 5A) is calculated as "75".

Moreover, for the worker 2, a work evaluation index is "8.0/minute" (refer to FIG. 6), and a duration time is "15 minutes", and thus, a future index of the worker 2 is calculated based on Equation (1-2), as in Equation (1-10).

$$8/\text{minute} \times 15 \text{ minutes} = 120 \qquad \text{Equation (1-10)}$$

Based on Equation (1-2), the future index of the worker 2 is calculated as "120", but a remaining work amount of the work section 5B is "50" which is an upper limit value of the future index, and therefore, the future index of the worker 2 (i.e., a future index of the work section 5B) is calculated as "50".

After calculating future indices for each of the work sections 5A and 5B for a case where a worker moves and a case where the worker does not move as described above, the comparison unit 27 compares the future index for moving with the future index for not moving (step S106).

Then, based on a result of the comparison, the determination unit 28 determines instruction contents related to movement of a worker (step S107). Herein, a specific example is described. For example, as in the specific example described above, when the workers 1 and 2 each move between the work sections 5A and 5B and a duration time is 10 minutes, a future index of the work section 5A is calculated as "40", and a future index of the work section 5B is calculated as "25".

In this case, a total (in short, a whole of a work process) of the future indices of the work sections 5A and 5B for a case where the workers 1 and 2 move is "65" (40+25=65).

On the other hand, when the workers 1 and 2 do not move and a duration time is 10 minutes, a future index of the work section 5A is calculated as "50", and a future index of the work section 5B is calculated as "50". In this case, a total (in short, a whole of a work process) of the future indices of the work sections 5A and 5B for a case where the workers 1 and 2 do not move is "100" (50+50=100).

The determination unit 28 acquires, from the comparison unit 27, a result of comparison between the future index "65" of a whole of a work process for a case where a worker moves and the future index "100" of a whole of a work process for a case where the worker does not move as described above. Since the future index is an estimated work amount in the duration time (10 minutes), it is preferable, in light of work efficiency, that the future index is greater. Thus, based on the comparison result of the future index, the determination unit 28 determines that work efficiency is better for a case where a worker does not move than a case where the worker moves. Accordingly, the determination unit 28 determines instruction contents of movement that the workers 1 and 2 do not move.

Furthermore, another specific example is described. For example, when the workers 1 and 2 each move between the work sections 5A and 5B and a duration time is 15 minutes, a future index of the work section 5A is calculated as "80", and a future index of the work section 5B is calculated as "50". A total of the future indices of the work sections 5A and 5B in this case is "130" (80+50=130).

On the other hand, when the workers 1 and 2 do not move and a duration time is 15 minutes, a future index of the work section 5A is calculated as "75", and a future index of the work section 5B is calculated as "50". In this case, a total of the future indices of the work sections 5A and 5B when the workers 1 and 2 do not move is "125" (75+50=125).

The determination unit 28 acquires, from the comparison unit 27, a result of comparison between the future index "130" of a whole of a work process for a case where a worker moves and the future index "125" of a whole of a work process for a case where the worker does not move as described above. Then, based on the result of the comparison, the determination unit 28 determines that work efficiency is better for a case where a worker moves than a case where the worker does not move. Accordingly, the determination unit 28 determines instruction contents of movement that the worker 1 moves to the work section 5B, and the worker 2 moves to the work section 5A.

The instruction contents of movement determined by the determination unit 28 in this way are output by the output device 70, and visually or auditorily transmitted to, for example, a work manager or a worker by the output device 70. Note that an information terminal owned by a work manager may be connected, as the output device 70, to the work management device 20, and the movement instruction contents may be transmitted to the work manager by the information terminal.

DESCRIPTION OF ADVANTAGEOUS EFFECT

The work management device 20 according to the second example embodiment is able to arrange a worker in such a way that, even in a situation where work efficiency changes, higher work efficiency is acquirable in a whole of a work process, in consideration of the change of work efficiency. This advantageous effect is described by use of a specific numerical value.

For example, herein, an evaluation method by using the following Equations (2-1) and (2-2) that do not consider a duration time of work efficiency is assumed as a comparative example.

$$\text{(estimated work end time for moving)} = \text{(remaining work amount/work efficiency after movement)} + \text{movement time} \quad \text{Equation (2-1)}$$

$$\text{(estimated work end time for not moving)} = \text{(remaining work amount/work efficiency before movement)} \quad \text{Equation (2-2)}$$

In a warehouse or the like, there are many cases where, unless all work processes related to one package targeted for a work are ended, the package cannot be delivered. Therefore, a process that delays delivery is a process whose work end time is latest among all the work processes. Thus, in order to advance delivery, it is considered that advancing a work in a process whose work end time is latest is suitable. In view of this, instruction contents for movement of a worker are determined as follows.

First, it is assumed that the worker 1 moves from the work section 5A to the work section 5B, and the worker 2 moves from the work section 5B to the work section 5A. It is also assumed that a batch input interval is 10 minutes. Further, it is assumed that a work evaluation index of the worker 1 is "5.0/minute", and a work evaluation index of the worker 2 is "8.0/minute" (refer to FIG. 6). Moreover, it is assumed that a movement time between the work sections 5A and 5B is "5 minutes" (refer to FIG. 5), a remaining work amount of the work section 5A is "80", and a remaining work amount of the work section 5B is "50" (refer to FIG. 7).

In this case, based on these numerical values and Equation (2-1), a time (estimated work end time) at which the worker 2 ends a work in the work section 5A is calculated as in Equation (2-3).

$$80/8.0+5=15 \quad \text{Equation (2-3)}$$

In short, the estimated work end time of the work section 5A is calculated as "15 minutes".

Moreover, a time (estimated work end time) at which the worker 1 ends a work in the work section 5B is calculated as in Equation (2-4).

$$50/5.0+5=15 \quad \text{Equation (2-4)}$$

In short, the estimated work end time of the work section 5B is calculated as "15 minutes".

Furthermore, when the workers 1 and 2 do not move, an estimated work end time of the work section 5A is calculated as "16 minutes" as in Equation (2-5).

$$80/5.0=16 \quad \text{Equation (2-5)}$$

Moreover, an estimated work end time of the work section 5B is calculated as "6.25 minutes" as in Equation (2-6).

$$50/8.0=6.25 \quad \text{Equation (2-6)}$$

Comparing calculation results as described above, a result that a work is ended earlier for a case where the workers 1 and 2 move than a case where the workers 1 and 2 do not move is acquired.

Figure 13:
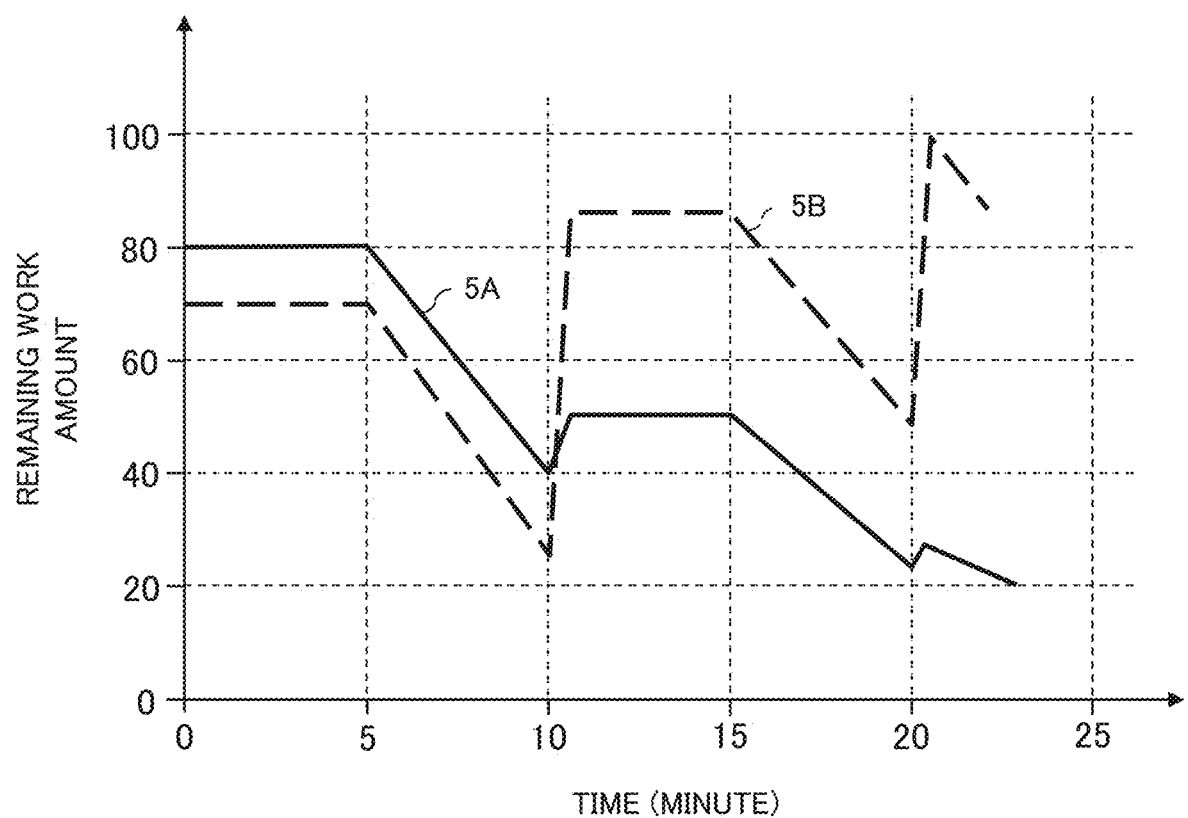
FIG. 13 is a diagram illustrating a temporal transition of a remaining work amount when a worker is allocated to a work section each time a batch is input.

Thus, the workers 1 and 2 are instructed to move. Then, when this instruction for movement is based on data at a batch input time point at a time 00:00, the next batch is input at a time 00:10 since an input interval of a batch is 10 minutes. When an input amount in this instance is an input amount as represented in FIG. 11, calculation and determination concerning movement of the workers 1 and 2 similar to those described above are performed, and the workers 1 and 2 are again instructed to move, in the above-described method that does not consider a duration time. FIG. 13 illustrates a transition example of remaining work amounts of the work sections 5A and 5B when whether or not the workers 1 and 2 move is determined by utilizing a method that does not consider a duration time of work efficiency.

Figure 12:
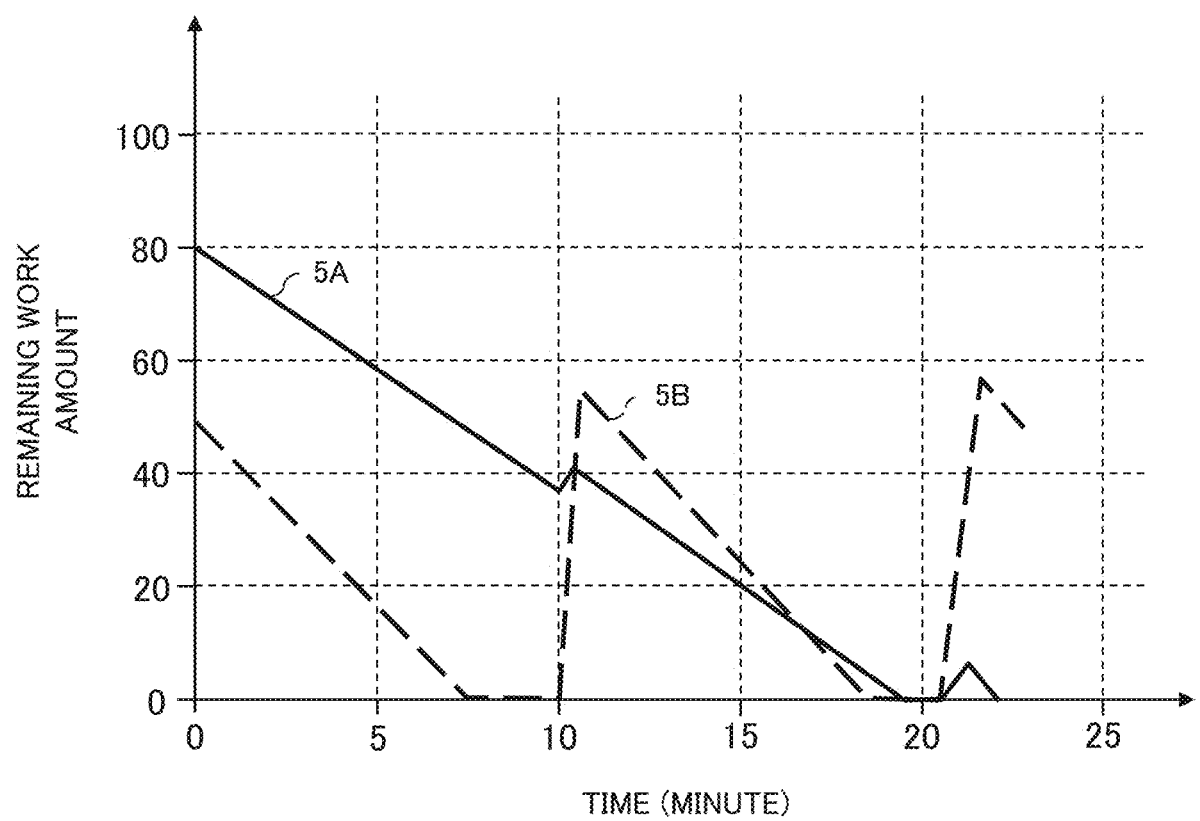
FIG. 12 is a diagram illustrating a temporal transition example of a remaining work amount when the work management device according to the second example embodiment allocates a worker to a work section.

In contrast, FIG. 12 illustrates a transition example of remaining work amounts of the work sections 5A and 5B when whether or not the workers 1 and 2 move is determined by utilizing the method in the description of the second example embodiment that considers a duration time of work efficiency.

Comparing FIG. 12 and FIG. 13, considering a duration time of work efficiency enables a state where a remaining work amount in each of the work sections 5A and 5B is small as a whole, in contrast to a case where a duration time of work efficiency is not considered. Thus, when a duration time of work efficiency is not considered, a change of work efficiency resulting from a situation change is not considered, and therefore, the workers 1 and 2 are instructed to move each time a batch is input. This leads to a situation where the workers 1 and 2 each have a large remaining work amount by taking time for movement and having a reduced work time.

The work management device 20 according to the second example embodiment considers a duration time of work efficiency, and determines whether or not a worker moves, based on information under a situation where it is possible to assume that there is no great change of a situation. Thus, even when it is not known what work amount is input in the next batch, the work management device 20 is able to arrange a worker in such a way that higher work efficiency is acquirable in a whole of a work process when an input interval of a batch is known or predictable.

Figures 14, 15:
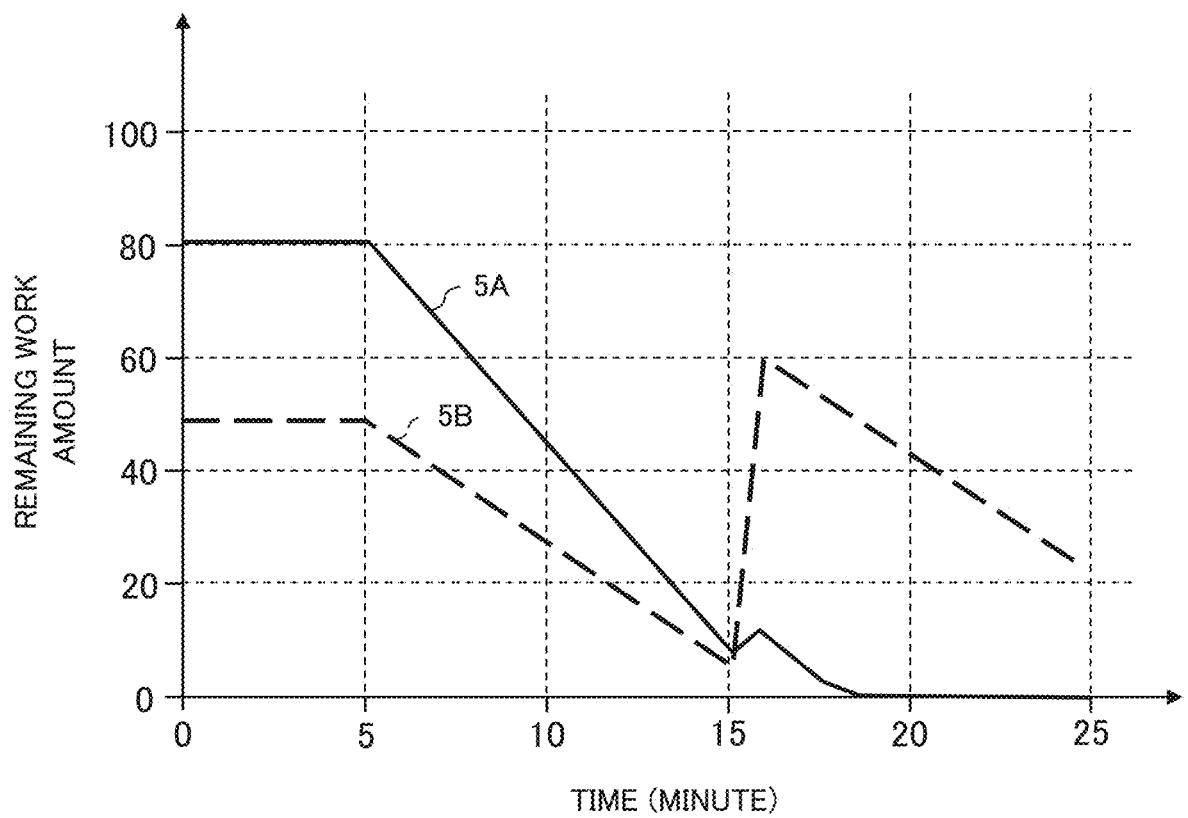
FIG. 14 is a diagram illustrating an example of an input time of a batch and an input amount thereof.
FIG. 15 is a diagram illustrating another temporal transition example of a remaining work amount when the work management device according to the second example embodiment allocates a worker to a work section.

Note that FIG. 15 illustrates a transition example of a remaining work amount of each of the work sections 5A and 5B in a case where the work management device 20 according to the second example embodiment determines whether or not a worker moves, when a batch input interval is 15 minutes, and a work amount as represented in FIG. 14 is input. In this case as well, the work management device 20 is able to acquire an advantageous effect similar to that described above.

Furthermore, the work management device 20 according to the second example embodiment calculates a work evaluation index, based on a situation of a work in a most recent evaluation period, and therefore, is able to acquire a work evaluation index according to a work status. In addition, the work management device 20 allocates a worker to a work section in consideration of a movement cost between work sections as well, therefore, enables allocation of a worker considering a work loss resulting from movement, and is thereby able to improve work efficiency. As a result, the work management device 20 is able to improve efficiency of a whole of a work process. Consequently, for example, even when work efficiency in a particular process is decreased due to physical condition aggravation of a worker or the like, the work management device 20 sequentially takes this into a work evaluation index, considers a movement cost, and then, is able to achieve increased efficiency in a whole of a work process.

Note that, according to the second example embodiment, a most recent evaluation period for calculating a work evaluation index may be set depending on time, or may be set depending on the number of times of instructions for a work (e.g., may be a period from a time point going back a plurality of numbers of times of instructions for a work). Further, a work history value in a most recent evaluation period utilized to calculate a work evaluation index may be work history data as it is, or may be a value obtained by performing predetermined processing on work history data. For example, data obtained by leveling history data for most recent N minutes, such as a linear weighted moving average or an exponential moving average, may be used as a work history value. In such a case, fluctuation of a value due to short-time measurement is suppressed, a work evaluation index closer to an actual situation is acquired, and the work management device 20 is able to achieve more appropriate allocation of a worker.

Moreover, although a movement cost is set for each path of movement according to the second example embodiment, a movement cost may be set in consideration of not only a movement path but also a worker. In this case, the work management device 20 is able to achieve more appropriate allocation of a worker by allocating a worker utilizing a movement cost that considers an age and a health state of the worker.

Furthermore, although a duration time is set based on a batch input interval according to the second example embodiment, an input timing of a work may not be set in advance. In such a case, a duration time may be set by use of statistical information to be calculated from order input history, and past spatiotemporal data about the number of workers. For example, a busy season, a busy time period, and the like may be estimated based on order input history, and a duration time may be set by utilizing the information. Moreover, a duration time may be set by use of shift information of a worker or the like. Further, a duration time may differ according to a work section. In these cases as well, an advantageous effect similar to that according to the second example embodiment is acquirable.

Still further, according to the second example embodiment, when comparison results by the comparison unit 27 are equal, the determination unit 28 may determine allocation of a worker by additionally utilizing an estimated work end time calculated by utilizing Equations (2-1) and (2-2) as well. In this case, the work management device 20 is able to appropriately allocate a worker to a work section as in a way described above, independently of a work amount of a work section.

Still further, according to the second example embodiment, the work management device 20 utilizes a movement cost (a movement time) when calculating a future index. Instead of the movement cost, the work management device 20 may calculate a future index by utilizing a financial cost related to productivity of a worker for movement, and a cost resulting from physical fatigue of the worker. In this case as well, the work management device 20 is able to acquire an advantageous effect similar to that described above.

Still further, as a specific example in which the work management device 20 allocates a worker to the work sections 5A and 5B, an example in which one worker is allocated to each of the work sections 5A and 5B is described. Instead of this, the work management device 20 according to the second example embodiment is also applicable to a case where a plurality of workers are allocated for each work section. A specific example thereof is described.

Herein, as illustrated in FIG. 16, it is assumed that the number of workers in the work section 5A is "15", and a work evaluation index of the work section 5A is "15.0". Moreover, it is assumed that the number of workers in the work section 5B is "5", and a work evaluation index of the work section 5B is "5.0". Further, as illustrated in FIG. 17, it is assumed that remaining work amounts of the work sections 5A and 5B are both "100".

Further, it is assumed that the comparison unit 27 calculates, based on Equations (3-1) and (3-2), future indices for a case where N workers move in and move out, for each of the work sections 5A and 5B.

$$\text{(future index for a case where } N \text{ persons move in)} = \text{(future index} \times \text{movement time)} + \text{(work index after movement)} \times \text{(duration time} - \text{movement time)} \quad \text{Equation (3-1)}$$

$$\text{(future index for a case where } N \text{ persons move out)} = \text{(work index after movement)} \times \text{duration time} \quad \text{Equation (3-2)}$$

Note that, herein, it is assumed that work efficiency per person is the same, and work efficiency (capacity) in each of the work sections 5A and 5B is determined depending on the number of personnel. In short, work efficiency in each of the work sections 5A and 5B varies in proportion to an increase or decrease in the number of workers due to movement.

In such a case, in order to increase work efficiency, the number of workers to be moved may be set in such way that a total future index in the work sections 5A and 5B (i.e., a work amount within a duration time) is maximized. In a case of numerical value examples of FIGS. 16 and 17, work efficiency of the work section 5A is better than that of the work section 5B, and thus, it is preferable to move a worker from the work section 5A to the work section 5B, in order to increase total work efficiency in the work sections 5A and 5B. The number of persons to be moved may be N, a future index based on Equation (3-2) may be calculated for the work section 5A, a future index based on Equation (3-1) may be calculated for the work section 5B, and N that maximizes a sum of the future indices may be calculated. Note that, at a time of the calculation, a remaining work amount of each of the work sections 5A and 5B is "100", and thus, an upper limit value of the future index is "100". In addition, it is assumed that, when the number of workers to be moved is calculated, the workers are immediately moved.

When the future index is calculated as described above, the future index "200" (a total of work amounts that can be ended in the work sections 5A and 5B) is obtained for N being in a numerical value range of "0 to 10". In this case, all works are completed in the work sections 5A and 5B, which means that a work is ended within a duration time even when a worker does not move (in short, when N is zero).

In such a case, a suitable value of N within the numerical value range of "0 to 10" is determined based on, for example, an estimated work end time of a worker in each of the work sections 5A and 5B. In other words, an estimated work end time of the work section 5A (in short, a work section from which a worker moves out) is calculated based on Equation (4-1). Moreover, an estimated work end time of the work section 5B (in short, a work section to which a worker moves in) is calculated based on Equation (4-2).

(estimated work end time)=(remaining work amount)
÷(work evaluation index after allocation
change)    Equation (4-1)

(estimated work end time)=((remaining work amount)−(work evaluation index)×(movement time))÷(work evaluation index after allocation change)    Equation (4-2)

Then, the number N of workers to be moved is determined in such a way that the estimated work end time of each of the work sections 5A and 5B is earlier. Note that, in the numerical value example of FIG. 17, when the number of workers to be moved is set to six in such a way that the number of persons allocated to the work section 5A is nine and the number of persons allocated to the work section 5B is eleven, the estimated work end time becomes earliest. In this case, when decimals are rounded off, the estimated work end time of the work section 5A is 11 minutes and 7 seconds, and the estimated work end time of the work section 5B is 11 minutes and 48 seconds. A whole work is not ended unless works in the work sections 5A and 5B are both ended, and thus, a total estimated work end time of the work sections 5A and 5B is 11 minutes and 48 seconds. On the other hand, when allocation is not altered (in short, when the number N of workers to be moved is zero), the estimated work end time of the work section 5A is 6 minutes and 40 seconds, but the estimated work end time of the work section 5B is 20 minutes. Thus, the total estimated work end time of the work sections 5A and 5B is 20 minutes. Namely, the work management device 20 also has a function of allocating a worker, based on an estimated work end time in addition to allocating a worker based on the above-described future index, and thereby, is able to more appropriately allocate a worker, and further improve work efficiency of a whole of a work process.

Note that, while the number of persons moving between the work sections 5A and 5B is calculated in the example described above, the determination unit 28 may further determine allocation of a worker, based on a work evaluation index for each worker. One example of a result of this determination is represented in FIG. 18.

In this case, the work management device 20 is able to specify not only the number of persons to be moved but also a worker to be moved, and therefore, save the trouble of selecting a person to be moved by a work manager. Then, by further utilizing, for example, a display or the like presenting a target person to be moved, the work management device 20 is able to automate a work instruction. Moreover, the work management device 20 is able to perform allocation of a worker considering an age and a health state of the worker.

Figure 19:
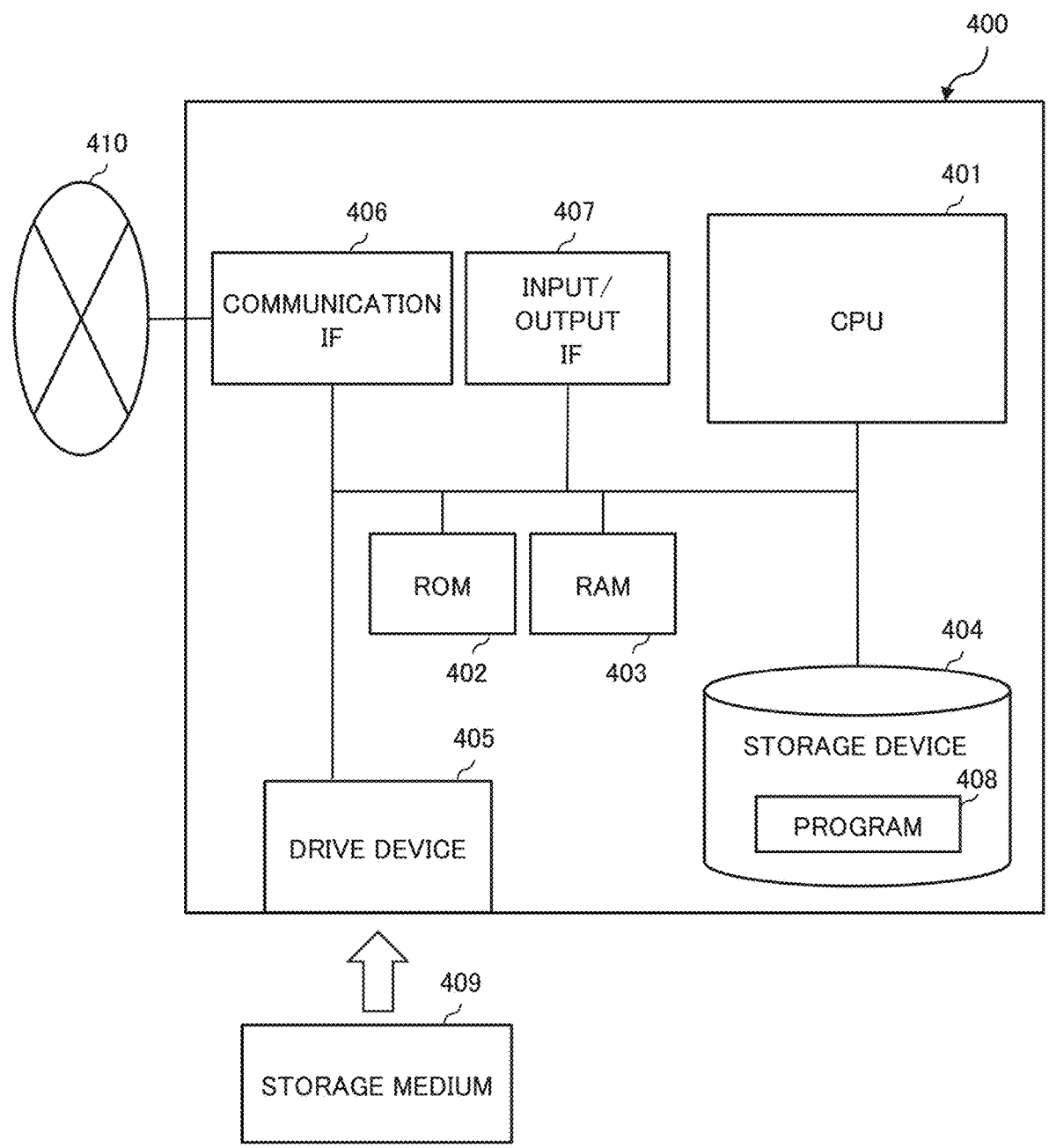
FIG. 19 is a diagram illustrating one example of a hardware configuration constituting a work management device.

FIG. 19 is a diagram representing a hardware configuration example of a computer 400 implementing the work management device 20. The computer 400 includes a central processing unit (CPU) 401, a read only memory (ROM) 402, a random access memory (RAM) 403, a storage device 404, a drive device 405, a communication interface (IF) 406, and an input/output interface (IF) 407.

The CPU 401 executes a computer program (a program) 408 by use of the RAM 403. The communication IF 406 exchanges information with an external device via an information communication network 410. The input/output IF 407 exchanges information with peripheral equipment (an input device, a display device, and the like). The communication IF 406 and the input/output IF 407 are each able to function as a component which acquires or outputs information.

The program 408 may be stored in the ROM 402. Moreover, the program 408 may be stored in a storage medium 409 such as a memory card, and read out by the drive device 405, or may be received from an external device via the information communication network 410.

For example, the control device 21 of the work management device 20 is implemented by the CPU 401, and the storage device 22 is implemented by the ROM 402, the RAM 402, and the storage device 404.

Note that each component of the computer 400 represented in FIG. 19 may be configured by a single circuitry (processor or the like), or may be configured by a combination of a plurality of circuitries. A circuitry referred to herein may be a dedicated or general-purpose circuitry. For example, the computer 400 may be implemented by a dedicated processor in one part, and implemented by a general-purpose processor in another part.

Furthermore, a function of the computer 400 may be implemented by cooperation of a plurality of computers, for example, by use of a cloud computing technique.

Third Example Embodiment

A third example embodiment according to the present invention is described below. Note that, in a description of the third example embodiment, the same reference sign is given to a part having the same name as the component constituting the work management device according to the second example embodiment, and a repeated description of the same part is omitted.

DESCRIPTION OF CONFIGURATION

Figure 20:
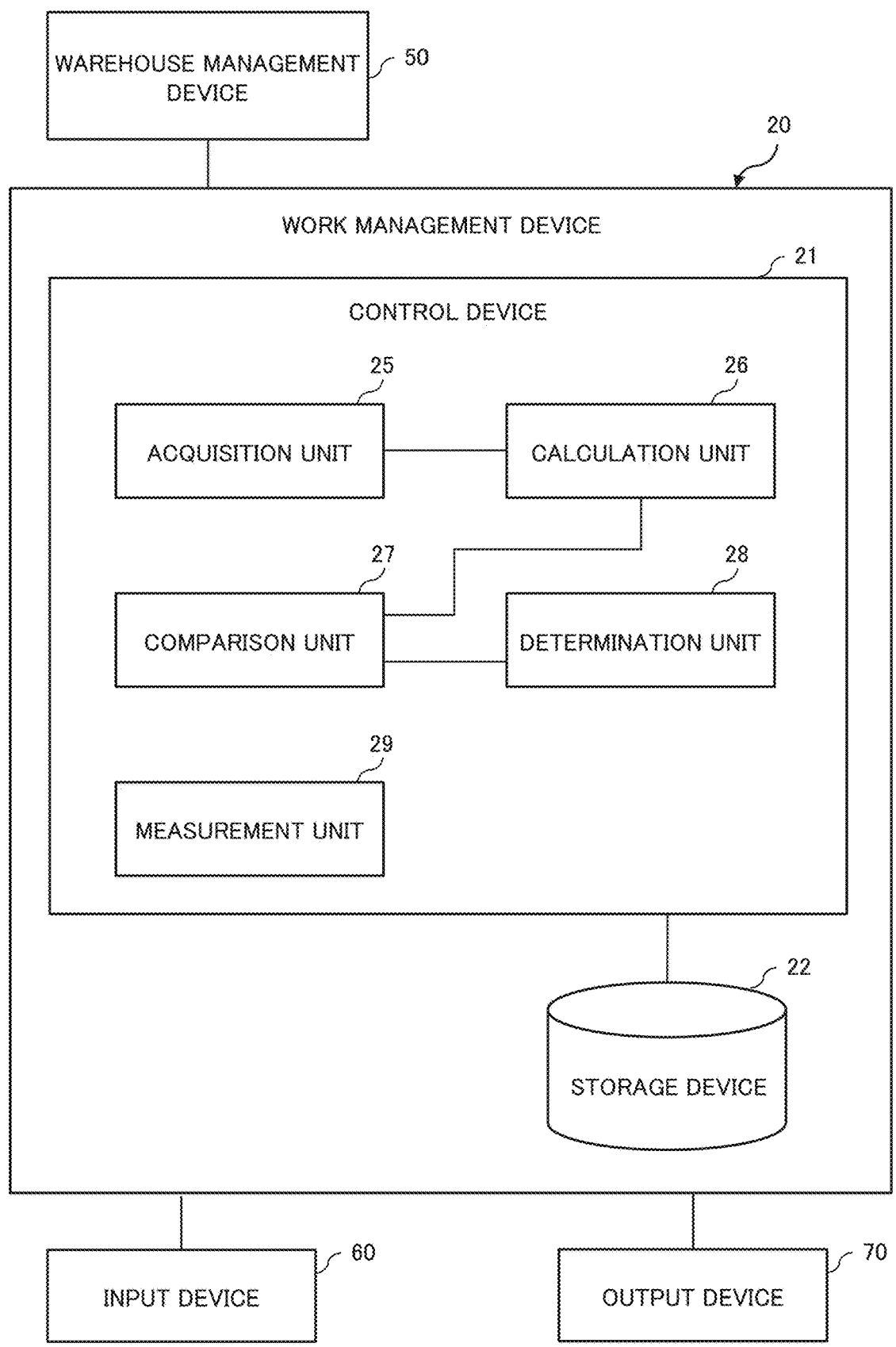
FIG. 20 is a block diagram illustrating a configuration of a work management device according to a third example embodiment of the present invention in a simplified form.

FIG. 20 is a block diagram illustrating a configuration of a work management device according to a third example embodiment in a simplified form. A work management device 20 according to the third example embodiment includes a measurement unit 29 in addition to the components according to the second example embodiment. The measurement unit 29 has a function of measuring (calculating) a duration time of work efficiency in a work section by use of schedule information or history information of a work status. For example, the measurement unit 29 acquires a time of batch input from, for example, a warehouse management device 50, and stores the acquired time in a storage device 22. Then, the measurement unit 29 calculates, based on the history information of the batch input time, a plurality of time intervals of batch input, further calculates an average of the time intervals, and designates the average value as a time interval of batch input (in short, a duration time). Alternatively, the measurement unit 29 may statistically process, by use of a least squares method, a Kalman filter, or the like, the time interval of batch input calculated as described above, and designate, as a duration time, a value acquired by the statistical processing. Further, the measurement unit 29 has a function of altering (updating) duration time data Dt of the storage device 22 to the duration time acquired as descried above. Namely, the measurement unit 29 has a function as a duration time update unit which acquires a duration time, based on actually measured data utilized for acquisition of a duration time, and updates information about the duration time.

Note that the measurement unit 29 may acquire, from, for example, the warehouse management device 50, information about a cycle of a busy time period and a time period for personnel shift, as schedule information of a work status. In this case, by considering the acquired information, the measurement unit 29 may measure (calculate), as a duration time, a time length until a time point at which a work status is expected to change from a measurement start time point.

The configuration other than the configuration described above in the work management device 20 according to the third example embodiment is similar to the configuration of the work management device according to the second example embodiment.

DESCRIPTION OF OPERATION

Figures 21, 22:
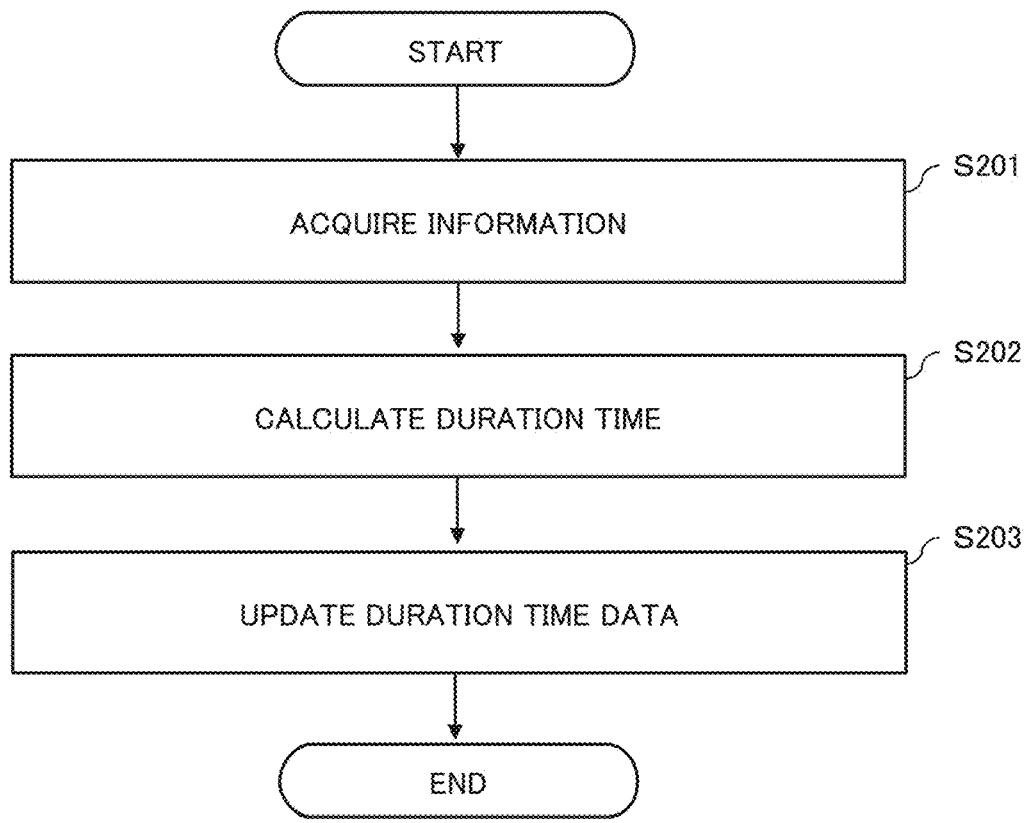
FIG. 21 is a flowchart for describing an operation example of the work management device according to the third example embodiment.
FIG. 22 is a diagram illustrating one example of an input time of a batch.

One example of an operation of the measurement unit 29 in the work management device 20 according to the third example embodiment is described below by utilizing FIG. 21.

For example, when the measurement unit 29 starts an operation, the measurement unit 29 first acquires, from, for example, the warehouse management device 50, history information of a batch input time, or schedule information of a work status (step S201).

Subsequently, the measurement unit 29 calculates a duration time as descried above, based on the acquired information (step S202). For example, the measurement unit 29 acquires history information of a batch input time as illustrated in FIG. 22, and when an average value of time intervals of batch input is calculated as a duration time, a duration time is calculated as "22 minutes".

Thereafter, the measurement unit 29 updates the duration time data Dt of the storage device 22 by the calculated duration time (step S203).

DESCRIPTION OF ADVANTAGEOUS EFFECT

The work management device 20 according to the third example embodiment allocates a worker to a work section in consideration of a change of work efficiency as in the second example embodiment, and therefore, is able to acquire an advantageous effect similar to that according to the second example embodiment. Moreover, the work management device 20 according to the third example embodiment includes the measurement unit 29, and has a function of calculating, based on actually measured data, a duration time by the measurement unit 29. Thus, even when a duration time is not clearly determined, the work management device 20 is able to acquire an appropriate duration time. Moreover, when a duration time (a change timing when a work evaluation index changes) varies depending on a change of a work status, the work management device 20 is able to acquire a duration time in which the status variation is reflected.

Fourth Example Embodiment

A fourth example embodiment according to the present invention is described below. Note that, in a description of the fourth example embodiment, the same reference sign is given to a part having the same name as the component constituting the work management device according to the second or third example embodiment, and a repeated description of the common part is omitted.

DESCRIPTION OF CONFIGURATION

Figure 23:
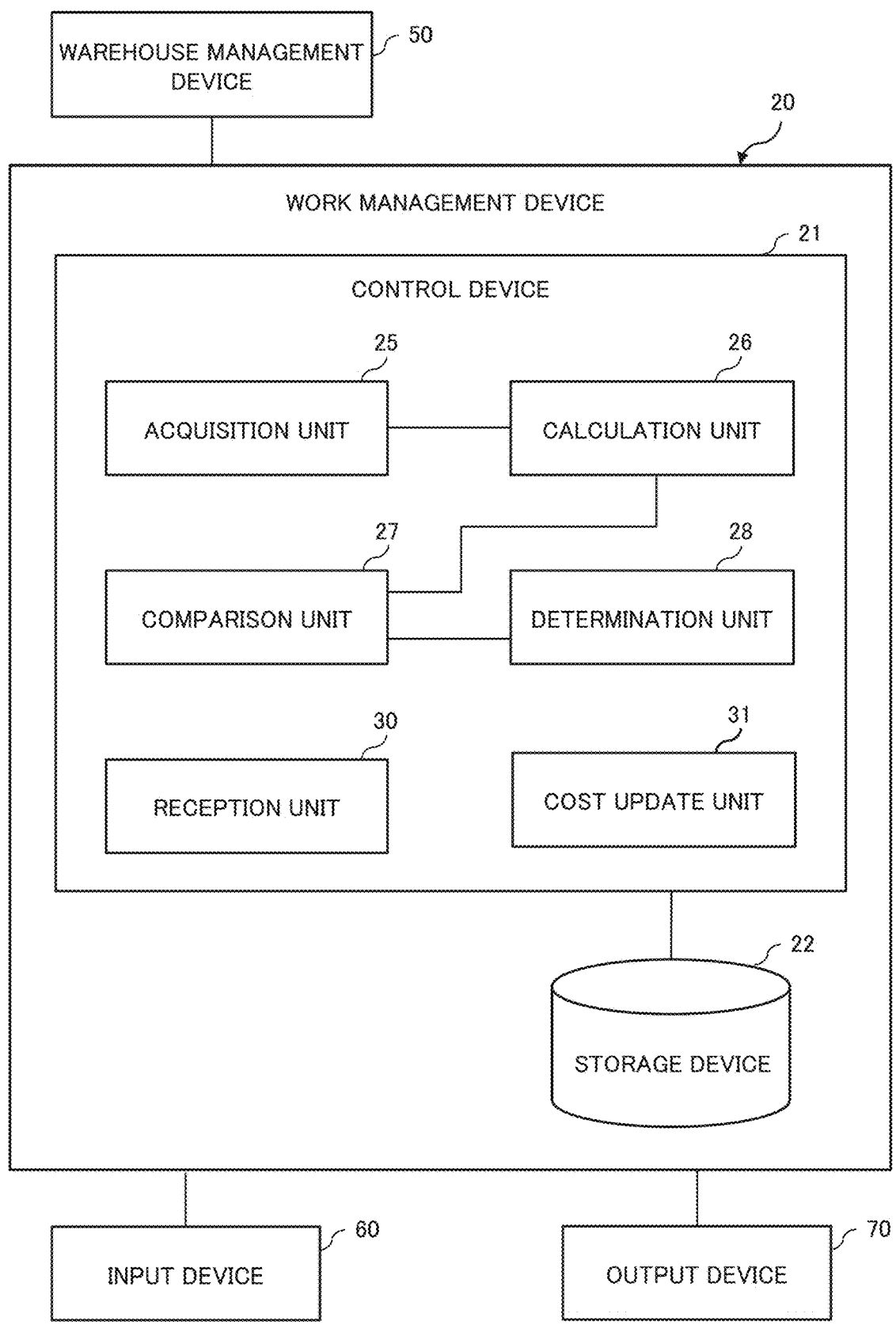
FIG. 23 is a block diagram illustrating a configuration of a work management device according to a fourth example embodiment of the present invention in a simplified form.

FIG. 23 is a block diagram illustrating a configuration of a work management device according to a fourth example embodiment in a simplified form. A work management device 20 according to the fourth example embodiment includes a reception unit 30 and a cost update unit 31 in addition to the components according to the second example embodiment.

The reception unit 30 according to the fourth example embodiment has a function of acquiring information for deciding whether or not a worker follows an instruction for movement. In short, a worker basically follows a given instruction for movement, but it is also conceivable that a worker cannot follow a movement instruction due to an actual work status or the like. Thus, the work management device 20 according to the fourth example embodiment has a configuration which enables a worker to input, to the work management device 20, whether or not the worker can follow an instruction, by information input or voice input utilizing a tablet or the like. The reception unit 30 has a function of receiving the information by the worker.

The cost update unit 31 has a function of acquiring, based on the information acquired by the reception unit 30, a movement status of a worker moving under a movement instruction, and directly or indirectly estimating (calculating) a movement cost between work sections, based on the movement status. For example, when a movement time between work sections is considered as a movement cost, the work management device 20 has a configuration which acquires information about movement start of a worker by utilizing touch panel input by a worker, a Bluetooth (registered trademark) low energy (BLE) device carried by a worker, or the like. Moreover, the work management device 20 has a configuration which acquires information about movement end of the worker by a similar method. The cost update unit 31 calculates, as a movement time (in short, a movement cost), a difference between a movement start time based on the information about movement start acquired as described above, and a movement end time based on the information about movement end. Note that the cost update unit 31 may further calculate, as a movement time (a movement cost), an average value of a plurality of movement times calculated in this way. Moreover, the cost update unit 31 may calculate, as a movement time (a movement cost), a time in which a plurality of calculated movement times are statistically processed using a least squares method, a Kalman filter, or the like.

The cost update unit 31 further has a function of updating movement cost data Dm of the storage device 22 to the calculated movement cost.

The configuration other than the configuration described above in the work management device 20 according to the fourth example embodiment is similar to the configuration of the work management device according to the second example embodiment. Note that the work management device 20 according to the fourth example embodiment may further have the function of the measurement unit 29 presented in the third example embodiment.

In addition to the configurations according to the second and third example embodiments, the work management device 20 according to the fourth example embodiment has a function of calculating a movement cost, based on actually measured data. Thus, the work management device 20 is able to acquire advantageous effects of the second and third example embodiments, and also able to acquire, when a movement time changes depending on a worker transfer, a work environment, or the like, a movement time in which the change is reflected.

Alternative Example Embodiment

Note that, although the example embodiments according to the present invention have been described with reference to the drawings, the present invention is not limited to the example embodiments described above, and various design changes or the like may be made without departing from the spirit of the present invention.

For example, although a work in relay-type picking is described as an example in the descriptions of the second to fourth example embodiments, the work management device according to the present invention is applicable to work processes in various fields such as supply chain management including a delivery work in a warehouse, an assembly process in a factory, loading and unloading of cargo at a harbor, and storage on and delivery from a truck, for example.

Furthermore, the work management device according to the present invention is able to acquire an advantageous effect by being applied to a case where a work section is settable, efficiency (a work evaluation index) in each work section changes depending on time, and the efficiency varies between work sections. For example, the work management device according to the present invention is also applicable to allocation of a taxi or the like. In short, when riding efficiency of a taxi is considered, it is apparent that riding efficiency is not even among regions. Moreover, a duration time in a situation where utilization of a taxi is increased due to returning home, after a last train, or due to occurrence of various events can be estimated by use of, for example, past statistical data. Accordingly, the work management device is able to calculate to which district and in what way a taxi is moved, by considering the estimated duration time, and using a riding efficiency function dependent on a region.

Furthermore, the work management device according to the present invention is applicable not only to arrangement of a person but also to arrangement of a device being an object that performs a work. In this case, for example, the work management device may determine whether or not to arrange or run a device that performs a construction, in consideration of a fuel cost or an electric power cost of the device.

Still further, although a movement cost is considered in the second to fourth example embodiments, a cost resulting from takeover determined by a combination of projects being assignment destinations, for example, may be considered depending on work contents.

Still further, although a work evaluation index (work efficiency) of a worker is the same regardless of a work section in the second to fourth example embodiments, a work evaluation index of a worker may differ depending on a work section (work efficiency). In this case, the work management device 20 calculates a future index or the like in consideration of a difference between a work evaluation index before movement of the worker and a work evaluation index after movement.

Still further, in the second to fourth example embodiments, an evaluation function representing how work efficiency in a work section changes depending on the number of workers and a duration time may be generated, and a change of work efficiency resulting from an increase or decrease in the number of workers may be evaluated based on the evaluation function. When a worker moves, work efficiency of a work section where workers are decreased lowers, and work efficiency of a work section where workers are increased increases. When an evaluation function is nonlinear, a sum of work efficiency of the work sections based on the evaluation function is not zero, but becomes a plus or a minus. The work management device according to the present invention may instruct about the number of workers to be moved by evaluating such an increase or decrease in an evaluation function, and considering a movement cost and a duration time of an environment.

Figure 24:
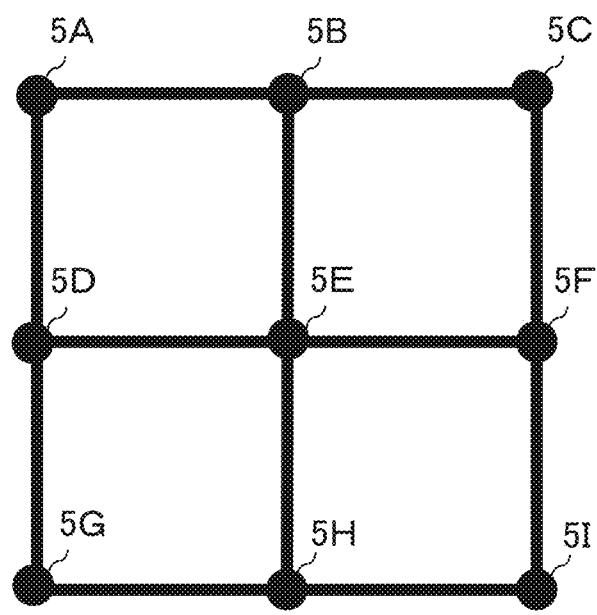
FIG. 24 is a diagram topologically illustrating a linkage between work sections when a work process (a work range) is divided into three or more work sections.

Still further, although the case where there are two work sections is described as an example in the second to fourth example embodiments, there may be three or more work sections. For example, FIG. 24 illustrates a topology visually representing a linkage (a movable combination) of work sections 5A, 5B, . . . , and 5I. Note that, although movement between adjacent work sections is enabled in the example of FIG. 24, movement among all reachable work sections may be enabled if necessary.

One example of movement cost data when a plurality of work sections are thus set is represented in FIG. 25. Moreover, an example of a work item in each work section illustrated in FIG. 25 is illustrated in FIG. 26. Further, information about a scheduled input time of a next batch in each work section illustrated in FIG. 25 is illustrated in FIG. 27. Still further, one example in which the work management device 20 according to each of the second to fourth example embodiments allocates a worker when the work section illustrated in FIG. 25 is set is illustrated in FIGS. 28 and 29. Still further, a display example of a display for instructing a work manager or a worker about movement is illustrated in FIG. 30. In this example, a movement path of a worker, and a selection item for selecting and then inputting information about whether or not the worker accepts a movement instruction are also represented. FIGS. 31 and 32 illustrate an example of movement cost data associated with work sections illustrated in FIG. 25, and an example of a movement cost calculated by the measurement unit 29 as presented in the third example embodiment.

While the invention has been particularly shown and described with reference to exemplary embodiments thereof, the present invention is not limited to these embodiments. It will be understood by those of ordinary skill in the art that various changes in form and details may be made therein without departing from the spirit and scope of the present invention as defined by the claims.

This application is based upon and claims the benefit of priority based on Japanese Patent Application No. 2017-072059 filed on Mar. 31, 2017, the disclosure of which is incorporated herein in its entirety by reference.

REFERENCE SIGNS LIST 10, 20 Work management device
11 Index acquisition unit
12 Duration time acquisition unit
13 Cost acquisition unit
14, 28 Determination unit
26 Calculation unit
27 Comparison unit

What is claimed is:
1. one or more processors configured to execute the instructions to: calculate, for each work section of a plurality of work sections divided from a whole region in a work range for relay-type picking work, work efficiency which is calculated, based on work history of work performed by working objects in the relay-type picking work, the relay-type picking work being one of a delivery work in a warehouse, an assembly process in a factory, loading and unloading of cargo at a harbor, and storage on and delivery from a truck;
calculate or read information about a duration time for which a state is expected to continue, the state being a state where the work efficiency based on a work status of a working object among the working objects is the work efficiency calculated, in the work section;

acquire information about a cost being a loss incurred when the working object moves between the work sections;

determine, based on an estimated work amount and the cost, arrangement of the working objects in the plurality of work sections in such a way as to increase work efficiency in the whole of the work range, the estimated work amount being estimated based on the work efficiency and being an amount of a work performed by the working object until the duration time is elapsed in the work section; and output, to a work manager or the working objects, movement instructions based on the determined arrangement of the working objects, wherein the one or more processors are further configured to execute the instructions to implement:

a remaining work amount acquisition unit configured to calculate, based on a work amount remaining in the work section, and the work efficiency, an end time at which a work of the remaining work amount in the work section ends;

a history information acquisition unit configured to acquire, as work history information, information about a work item and a number of works conducted in a most recent period set as an evaluation period; and an index determination unit configured to calculate, based on the work efficiency, the information about the duration time, and the information about the cost, a first future index depending on an estimated amount of a work performed by the working object until the duration time is elapsed for a case where the working object moves, calculate, based on the work efficiency and the information about the duration time, a second future index depending on an estimated amount of a work performed by the working object until the duration time is elapsed for a case where the working object does not move, and compare the first future index and the second future index.

2. The work management device according to claim 1, wherein
the arrangement of the working objects in the plurality of work sections is determined, based on a comparison result.

3. The work management device according to claim 1, wherein
the one or more processors are further configured to execute the instructions to:
calculate the cost, based on actually measured data utilized for calculation of the cost resulting from movement of the working object, and update the information about the cost.

4. The work management device according to claim 1, wherein
the one or more processors are further configured to execute the instructions to:
acquire the duration time, based on actually measured data utilized for acquisition of the duration time, and update the information about the duration time.

5. The work management device according to claim 1, wherein
the cost resulting from movement of the working object is a cost considering a movement path of the working object, and
the one or more processors are further configured to execute the instructions to:
determine a movement path of the working object.

6. The work management device according claim 1, and the arrangement of the working objects in the plurality of work sections is determined in further consideration of the end time.

7. A work management method performed by at least one processor, the work management method comprising: calculating, for each work section of a plurality of work sections divided from a whole region in a work range for relay-type picking work, work efficiency which is calculated, based on work history of work performed by working objects in the relay-type picking work, the relay-type picking work being one of a delivery work in a warehouse, an assembly process in a factory, loading and unloading of cargo at a harbor, and storage on and delivery from a truck;
calculating or reading information about a duration time being a calculated value or a setting value for which a state is expected to continue, the state being a state where the work efficiency based on a work status of a working object among the working objects is the work efficiency calculated, in the work section; acquiring information about a cost being a loss incurred when the working object moves between the work sections;
determining, based on an estimated work amount and the cost, arrangement of the working objects in the plurality of work sections in such a way as to increase work efficiency in the whole of the work range, the estimated work amount being estimated based on the work efficiency and being an amount of a work performed by the working object until the duration time is elapsed in the work section;
outputting, to a work manager or the working objects, movement instructions based on the determined arrangement of the working objects; and implementing, by the at least one processor;
a remaining work amount acquisition unit configured to calculate, based on a work amount remaining in the work section, and the work efficiency, an end time at which a work of the remaining work amount in the work section ends;
a history information acquisition unit configured to acquire, as work history information, information about a work item and a number of works conducted in a most recent period set as an evaluation period; and
an index determination unit configured to calculate, based on the work efficiency, the information about the duration time, and the information about the cost, a first future index depending on an estimated amount of a work performed by the working object until the duration time is elapsed for a case where the working object moves, calculate, based on the work efficiency and the information about the duration time, a second future index depending on an estimated amount of a work performed by the working object until the duration time is elapsed for a case where the working object does not move, and compare the first future index and the second future index.

8. A non-transitory computer readable storage medium recording thereon a program causing a computer to perform processes comprising:
calculating, for each work section of a plurality of work sections divided from a whole region in a work range for relay-type picking work, work efficiency which is calculated, based on work history of work performed by working objects in the relay-type picking work, the relay-type picking work being one of a delivery work in a warehouse, an assembly process in a factory, loading and unloading of cargo at a harbor, and storage on and delivery from a truck;

calculating or reading information about a duration time being a calculated value or a setting value for which a state is expected to continue, the state being a state where the work efficiency based on a work status of a working object among the working objects is the work efficiency calculated, in the work section;

acquiring information about a cost being a loss incurred when the working object moves between the work sections;

determining, based on an estimated work amount and the cost, arrangement of the working objects in the plurality of work sections in such a way as to increase work efficiency in the whole of the work range, the estimated work amount being estimated based on the work efficiency and being an amount of a work performed by the working object until the duration time is elapsed in the work section;

outputting, to a work manager or the working objects, movement instructions based on the determined arrangement of the working objects; and implementing, by at least one processor of the computer;

a remaining work amount acquisition unit configured to calculate, based on a work amount remaining in the work section, and the work efficiency, an end time at which a work of the remaining work amount in the work section ends;

a history information acquisition unit configured to acquire, as work history information, information about a work item and a number of works conducted in a most recent period set as an evaluation period; and an index determination unit configured to calculate, based on the work efficiency, the information about the duration time, and the information about the cost, a first future index depending on an estimated amount of a work performed by the working object until the duration time is elapsed for a case where the working object moves, calculate, based on the work efficiency and the information about the duration time, a second future index depending on an estimated amount of a work performed by the working object until the duration time is elapsed for a case where the working object does not move, and compare the first future index and the second future index.

9. The work management device according to claim 1, wherein an end of the duration time for which the state is expected to continue corresponds a timing of batch input.

* * * * *